United States Patent
Long et al.

(10) Patent No.: US 9,573,062 B1
(45) Date of Patent: Feb. 21, 2017

(54) METHODS AND SYSTEMS FOR VIRTUAL REALITY STREAMING AND REPLAY OF COMPUTER VIDEO GAMES

(71) Applicant: Sliver VR Technologies, Inc., Cupertino, CA (US)

(72) Inventors: Jieyi Long, Santa Clara, CA (US); Mitchell C. Liu, Los Altos, CA (US)

(73) Assignee: Silver VR Technologies, Inc., Cupertino, CA (US)

( * ) Notice: Subject to any disclaimer, the term of this patent is extended or adjusted under 35 U.S.C. 154(b) by 0 days.

(21) Appl. No.: 15/292,350

(22) Filed: Oct. 13, 2016

Related U.S. Application Data

(63) Continuation-in-part of application No. 14/960,421, filed on Dec. 6, 2015, now Pat. No. 9,473,758.
(Continued)

(51) Int. Cl.
A63F 13/497 (2014.01)
A63F 13/5252 (2014.01)
(Continued)

(52) U.S. Cl.
CPC ........... *A63F 13/5252* (2014.09); *A63F 13/25* (2014.09); *A63F 13/35* (2014.09); *A63F 13/86* (2014.09);
(Continued)

(58) Field of Classification Search
CPC A63F 13/497; A63F 13/5252; A63F 13/5258; A63F 13/525; A63F 2300/634; A63F 2300/6661; A63F 2300/6669; A63F 2300/577; G06T 3/0062; G06T 19/006
See application file for complete search history.

(56) References Cited

U.S. PATENT DOCUMENTS 5,130,794 A * 7/1992 Ritchey ................. F41G 7/30
348/383
6,020,931 A * 2/2000 Bilbrey ................. H04N 5/222
348/584
(Continued)

OTHER PUBLICATIONS

Kamcord, "Watch Mobile Games, Watch live streams from your favorite mobile games and chat with top gamers," Kamcord website, available at https://www.kamcord.com Accessed on Dec. 2, 2015.
(Continued)

*Primary Examiner* — David Harvey
(74) *Attorney, Agent, or Firm* — American Patent Agency PC; Daniar Hussain; Xiaomeng Shi

(57) ABSTRACT

Methods and systems for generating spherical game videos for virtual reality (VR) streaming and replay are disclosed. The method, when executed by a processor, comprises first recording game environment around a virtual camera array inserted into a source computer game that lacks spherical video output, using a first subset of virtual cameras within the virtual camera array. Next, receiving game metadata of a source game play of the source game, configuring a local game play according to the received game metadata, recording a video of the local game play using a second subset of virtual cameras, wherein the second subset of virtual cameras is not equal to the first subset of virtual cameras, and generating a spherical video from the recorded game environment and the recorded local game play. The present invention aids the mass adoption of VR technology by easily generating VR content from existing computer games.

26 Claims, 19 Drawing Sheets

Related U.S. Application Data

(60) Provisional application No. 62/402,886, filed on Sep. 30, 2016.

(51) Int. Cl.

| | | |
|---|---|---|
| *A63F 13/35* | (2014.01) | |
| *A63F 13/25* | (2014.01) | |
| *A63F 13/86* | (2014.01) | |
| *H04N 13/00* | (2006.01) | |
| *G06T 19/00* | (2011.01) | |
| *H04N 13/02* | (2006.01) | |

(52) U.S. Cl.
CPC ......... *G06T 19/006* (2013.01); *H04N 13/0055* (2013.01); *H04N 13/0066* (2013.01); *H04N 13/0242* (2013.01); *H04N 13/0278* (2013.01); *A63F 2300/8082* (2013.01)

(56) References Cited

U.S. PATENT DOCUMENTS

| | | | |
|---|---|---|---|
| 6,124,862 A | | 9/2000 | Boyken et al. |
| 6,141,034 A | * | 10/2000 | McCutchen ............ G02B 27/22 348/36 |
| 6,157,385 A | * | 12/2000 | Oxaal ..................... G03B 37/02 345/427 |
| 6,650,329 B1 | * | 11/2003 | Koike ..................... A63F 13/10 345/419 |
| 6,699,127 B1 | * | 3/2004 | Lobb ....................... A63F 13/10 345/418 |
| 7,015,954 B1 | | 3/2006 | Foote et al. |
| 7,446,772 B2 | | 11/2008 | Wong et al. |
| 9,314,691 B2 | * | 4/2016 | Perlman ................ H04L 65/403 |
| 9,445,081 B1 | * | 9/2016 | Kouperman ............ H04N 5/247 |
| 9,473,758 B1 | * | 10/2016 | Long ..................... G06T 19/006 |
| 2001/0040671 A1 | * | 11/2001 | Metcalf .................... G09F 19/18 353/94 |
| 2002/0154214 A1 | | 10/2002 | Scallie et al. |
| 2012/0028707 A1 | * | 2/2012 | Raitt ........................ A63F 13/63 3/63 |
| 2012/0093481 A1 | * | 4/2012 | McDowell ............ G11B 27/105 386/241 |
| 2012/0100910 A1 | * | 4/2012 | Eichorn ................. A63F 13/497 463/31 |
| 2013/0070047 A1 | * | 3/2013 | Digiovanni ............ H04N 5/222 348/36 |
| 2013/0243351 A1 | * | 9/2013 | Feng ..................... G06T 3/4038 382/284 |
| 2014/0192087 A1 | * | 7/2014 | Frost ....................... G06F 3/011 345/633 |
| 2014/0323213 A1 | * | 10/2014 | Wakeford ............. A63F 13/497 463/31 |
| 2015/0012827 A1 | * | 1/2015 | Elmeih ............... G06F 3/04842 715/719 |
| 2015/0289032 A1 | * | 10/2015 | Vermolen ............ H04N 21/854 725/74 |
| 2015/0350628 A1 | * | 12/2015 | Sanders .................. G06T 15/08 345/419 |
| 2015/0375103 A1 | * | 12/2015 | George ................... A63F 13/86 463/24 |
| 2016/0012855 A1 | * | 1/2016 | Krishnan ............. G11B 27/105 386/241 |
| 2016/0119551 A1 | * | 4/2016 | Brown .................. G06T 3/0093 345/646 |
| 2016/0142697 A1 | * | 5/2016 | Budagavi ............. H04N 19/117 348/43 |
| 2016/0214012 A1 | * | 7/2016 | Nishikawa ............ A63F 13/497 |
| 2016/0219241 A1 | * | 7/2016 | Korneliussen ....... H04N 7/0127 |

OTHER PUBLICATIONS

Everyplay, "Explore Greatest Games," Everyplay website, available at https://everyplay.com/explore Accessed on Dec. 2, 2015.

Valve Developer Community, "SourceTV," SourceTV wikipedia page on the Valve Developer Community website, available at http://developer.valvesoftware.com/wiki/Source_TV Accessed on Dec. 2, 2015.

Twitchtv, "Twitch," Twitch.tv platform, available at http://www.twitch.tv Accessed on Dec. 2, 2015.

Youtube, "Virtual Reality Videos," YouTube Help page, Upload instructions and settings, available at https://support.google.com/youtube/answer/6316263?hl=en&ref_topic=2888648 Accessed on Dec. 2, 2015.

OliVR, "VR Panorama 360 PRO Renderer," VR Panorama Renderer for Unity 5, available at https://www.assetstore.unity3d.com/en/#!/content/35102 Accessed on Dec. 2, 2015.

\* cited by examiner

METHODS AND SYSTEMS FOR VIRTUAL REALITY STREAMING AND REPLAY OF COMPUTER VIDEO GAMES

REFERENCE TO RELATED APPLICATIONS

This application is a non-provisional of provisional U.S. Ser. No. 62/402,886, filed on 30 Sep. 2016, entitled "Methods and Systems for Virtual Reality Streaming and Replay of Computer Video Games," and is also a Continuation-In-Part (CIP) of and claims the benefit of priority to U.S. Ser. No. 14/960,421, filed on 6 Dec. 2015, entitled "Methods and Systems for Game Video Recording and Virtual Reality Replay," issued as U.S. Pat. No. 9,473,758, on 18 Oct. 2016, the entire disclosures of both of which are incorporated by reference in their entireties herein.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the present invention are in the field of immersive video gaming, and pertain particularly to methods and systems for game video generation for streaming and replay in a virtual reality (VR) environment.

BACKGROUND OF THE INVENTION

The statements in this section may serve as a background to help understand the invention and its application and uses, but may not constitute prior art.

Modern computing technology have brought in a new era of immersive video experiences with virtual reality. Whether playing a video game or watching a sports event, immersion enhances the experience by making it more realistic, engaging, and interactive, with images, sounds, and haptic feedbacks that simulate the user's presence in a virtual three-dimensional (3D) environment. Virtual reality has seen uses in applications such as gaming, movies and television, architecture, and telepresence, yet ground-up development of virtual reality content for mass mainstream adoption is still non-trivial and expensive. Within the gaming universe, converting existing video games and eSport platforms into their VR counterparts is equally challenging, as traditional controls and user interfaces often do not work well in VR, while simulation sickness and latency also need to be taken into account. Moreover, 360-degree rendering and recording of an existing 3D game is generally too resource intensive for low-end platforms or user devices, where rendering, compressing, and streaming of VR videos necessitate high processing power, careful memory management, and bandwidth optimization. Moreover, production-ready offline rendering systems can produce 360 stereoscopic panorama videos for game replay in a VR environment, but such systems are generally incapable of real-time live game play capture and streaming.

Therefore, in view of the aforementioned difficulties, there is an unsolved need to make it easy to capture and record real-time live game plays of existing video games, and stream, replay or even live-play in a virtual reality environment.

It is against this background that various embodiments of the present invention were developed.

BRIEF SUMMARY OF THE INVENTION

A system is provided for rendering and recording game video during game play, for streaming, replaying, or live-playing in a virtual reality environment.

More specifically, in one aspect, one embodiment of the present invention is a system for generating spherical videos from computer games. The system includes a server having access to at least one processor, and a non-transitory physical medium for storing a source computer game and for storing program code. The non-transitory physical medium is accessible by the server. The program code, when executed by the processor, causes the processor to perform the step of recording game environment around a virtual camera array inserted into the source computer game, using a first subset of virtual cameras within the virtual camera array, wherein the virtual camera array includes a plurality of virtual cameras each facing a different direction, and wherein the source computer game lacks spherical video output. The program code further causes the process to perform the steps of receiving game metadata of a source game play of the source computer game, configuring a local game play of the source computer game according to the received game metadata, recording a video of the local game play using a second subset of virtual cameras within the virtual camera array, wherein the second subset of virtual cameras is not equal to the first subset of virtual cameras, and generating a spherical video by from the recorded game environment around the virtual camera array and the recorded video of the local game play.

In some embodiments of the present invention, the source computer game is selected from the group consisting of 2D games and 3D games. In some embodiments, the source game play is a live game play. In some embodiments, the virtual camera array is positioned at a fixed location within the source game. In some embodiments, the spherical video generation is by aligning and stitching game environment recorded by virtual cameras in the first subset but not in the second subset, to the video of the game play recorded by the second subset of virtual cameras. In some embodiments, at least one virtual camera within the second subset of virtual cameras records the local game play at a spatial or temporal frequency different from those of the virtual cameras within the first subset of virtual cameras.

In another aspect, one embodiment of the present invention is a system for generating spherical videos from computer games. The system including a server having access to at least one processor, and a non-transitory physical medium for storing a source computer game and for storing program code. The non-transitory physical medium is accessible by the server. The program code, when executed by the processor, causes the processor to perform the step of recording game environment around a plurality of virtual camera arrays inserted into the source computer game, wherein for each virtual camera array, the game environment is recorded using a first subset of virtual cameras within the virtual camera array, wherein each virtual camera array includes a plurality of virtual cameras each facing a different direction, and wherein the source computer game lacks spherical video output. The program code further causes the processor to perform the steps of receiving game metadata of a source game play of the source computer game, configuring a local game play of the source computer game according to the received game metadata, selecting a virtual camera array from the plurality of virtual camera arrays based on an optimized perspective or a user input, recording a video of the local game play using a second subset of virtual cameras within the selected virtual camera array, wherein the second subset of virtual cameras is not equal to the first subset of virtual cameras within the selected virtual camera array used to record the game environment around the selected virtual camera array, and generating a spherical video from the recorded game environment around the selected virtual camera array and the recorded video of the local game play.

In yet another aspect, one embodiment of the present invention is a non-transitory computer-readable storage medium for generating spherical videos from computer games. The non-transitory computer-readable storage medium comprising a source computer game and program code stored thereon, that when executed by a processor, causes the processor to perform the steps described herein.

In some embodiments of the present invention, the optimized perspective is optimized over locations of the plurality of virtual camera arrays within a game map with respect to a set of positions within the game map, and contents of the game map. In some embodiments, the optimized perspective is determined by analyzing a player field view. In some embodiments, the optimized perspective is optimized over a distance and viewing angle towards a player position. In some embodiments, the user input is from a broadcaster, a player, or a spectator. Furthermore, in some embodiments, the selection of the virtual camera array is limited to a proper subset of the plurality of virtual camera arrays.

In some embodiments of the present invention, the source computer game is selected from the group consisting of 2D games and 3D games. In some embodiments, the source game play is a live game play. In some embodiments, each of the plurality of virtual camera arrays is positioned at a fixed location within the source game. In some embodiments, the spherical video generation is by aligning and stitching game environment recorded by virtual cameras in the first subset but not in the second subset of virtual cameras within the selected virtual camera array, to the video of the local game play recorded by the second subset of virtual cameras within the selected virtual camera array.

Yet other aspects of the present invention include methods, processes, and algorithms comprising the steps described herein, and also include the processes and modes of operation of the systems and servers described herein. Other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which.

DETAILED DESCRIPTION OF THE INVENTION

Definitions

Figure 1:
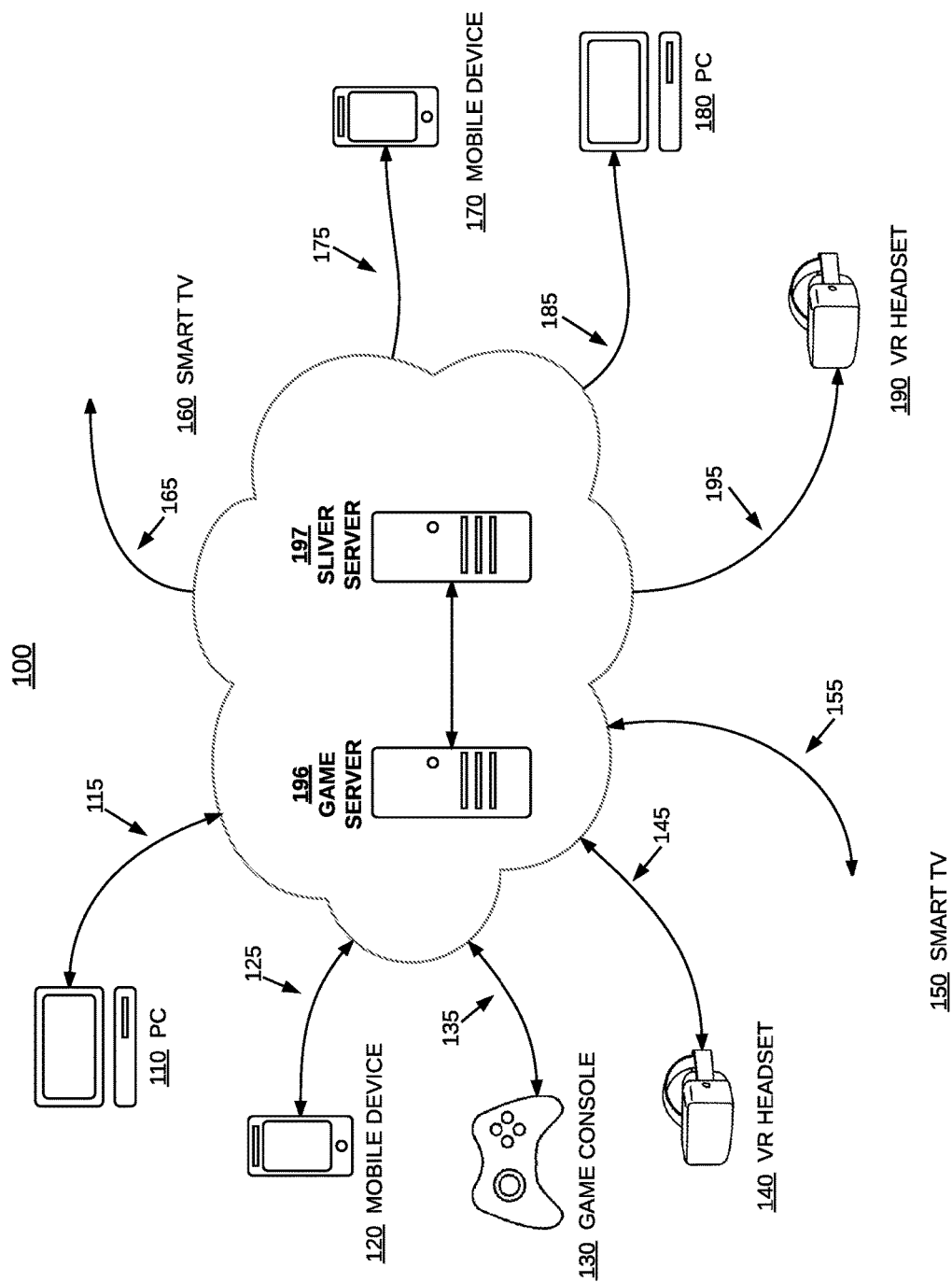
FIG. 1 is a network configuration diagram in which the present invention may be practiced, according to one embodiment of the present invention.

Some illustrative definitions are provided to assist in understanding the present invention, but these definitions are not to be read as restricting the scope of the present invention. The terms may be used in the form of nouns, verbs, or adjectives, within the scope of the definition.

"Spherical video," "360 video," "360-degree spherical video," "3D-360 video," or "VR video" is a video with a 360-degree horizontal viewing angle, and possibly a 180-degree vertical viewing angle. In other words, a spherical video is an immersive video where the view in every direction is available at the same time. A spherical video may be viewed in full VR mode with a VR headset, or in slidable panorama-360 mode on a conventional 2D or 3D viewing device. Playback of spherical videos in a VR environment is interactive, with the viewer having control over the viewing directions.

"Spherical media" are any visual media with a 360-degree horizontal viewing angle, and may include panoramic images, screenshots, slideshows, and spherical videos.

"Monoscopic" videos contain visual images that do not provide the perception of depth to the viewer. Monoscopic videos are generally captured from the perspective of a single eye.

"Stereoscopic" videos contain offset visual images to provide the illusion of depth perception when shown on a stereoscopic display. Stereoscopic videos are generally captured separately for both left and right eyes. Stereoscopic display devices may present side-by-side images or use autostereoscopy methods or the like to create depth perceptions.

"Panorama-360 mode" or "Slidable panorama-360 mode" is a display mode where spherical media are shown in panoramic form, possibly on a conventional 2D or 3D viewing device. Interactive user control such as cursor movements or screen swipes may be enabled to direct the viewing angle horizontally or vertically.

"Full VR mode" or "3D-360 mode" is a display mode where spherical media are shown in a fully immersive VR environment, possibly through a head-mounted device such as a VR headset. Interactive user control of the viewing angle is facilitated through head and body movements, and 3D audio is often provided concurrently.

"Game Broadcast" and "Game Streaming" broadly refer to the constant delivery of spherical media content to one or more end viewers while being provided by the systems disclosed herein. Live-broadcast and live-streaming refer to spherical media content delivery in real-time, for example, as game plays happen. A noticeable time delay in terms of seconds of minutes may be present during a live-broadcast or live-stream.

"Virtual camera array" is a set of virtual cameras configured in a video game to capture the virtual world in a wide viewing angle, possibly in 360 degrees horizontally and 180 degrees vertically. A virtual camera array includes one or more virtual cameras, each facing a different direction. Similar to physical camera arrays, a virtual camera array may be associated with a set of position coordinates to uniquely identify its location within a game universe or game world, and each virtual camera within a virtual camera array may be characterized in terms of orientation, viewing angle and focal length, zoom factor, and the like.

"Capture" or "Record" within a virtual game world refers the saving or storage of rendered game graphics data, with or without explicit graphical displays on a computer device.

"Single frame infinite perspective" is a curvilinear perspective that describes the immersive view captured across and beyond 360 degrees. An exemplary single frame infinite perspective image is a 360-degree panorama of a scene. Another exemplary single frame infinite perspective media is a stereoscopic video played through a VR headset, where the viewer can rotate his or her head in real-time to see what is happening in the surrounding environment in any viewing direction.

"Non-transitory storage medium," "physical medium," "storage medium," and the like refer to an article of manufacture in which computer program code may be stored, said program code later to be executed by a computing device having access to at least one hardware processor, such as a server, a cloud repository, an end-user device, and so on.

"Data repository" and the like refers to a central place, such as a database, where data is stored and maintained. It is also a logical (and sometimes physical) partitioning of data where multiple databases which apply to specific applications or sets of applications reside.

"Interface," "user interface," "graphical user interface (GUI)," and the like is a user interface (UI) in a display of a computer screen, where a user of a computer system can provide input.

"Server" is a computer comprising a processor and a memory that is used by the system to provide the software program code implementing the invention to multiple client devices over a communications network.

"User" is a person or device that interacts with the SLIVER system as disclosed herein. A user may represent a broadcaster, a player, or a spectator of a computer game. A broadcaster may be a presenter or a commentator to a game broadcast. A broadcaster or a player may stream game plays in real-time. A player may be a person or a bot. A spectator observes or watches game plays unfold, often with special access to player and game information. A user may also be called a viewer to the system.

"User-device", "end-user device", "mobile device," and the like refer to a computer with a display, input options, a processor and a memory, often in the form of a laptop, desktop, tablet, smartphone, or the like, that is used by users of the SLIVER system to interact with and access the services of the present invention.

"Client-server connection", "communications link", and the like is a connection between a sever and a user-device via a communications network.

"Algorithm" is a set of instructions to be followed in calculations or processing, especially by a computing device. In a computer implemented method or system, the term algorithm may be used interchangeably with the terms "rules" or "instructions," to refer to a sequence of steps to be carried out by a computer processor following instructions encoded in memory. An algorithm can be encoded in program code stored on a physical storage medium.

"One embodiment" or "an embodiment" means that a particular feature, structure, or characteristic described in connection with the embodiment is included in at least one embodiment of the invention. The appearance of the phrase "in one embodiment" in various places in the specification is not necessarily all referring to the same embodiment, nor is a separate or alternative embodiment mutually exclusive of other embodiments. Various features are described which may be exhibited by some embodiments and not others.

Overview

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon the invention.

Broadly, embodiments of the present invention relate to immersive video gaming, and pertain particularly to methods and systems for spherical game video generation for streaming and replay in a VR environment. More specially, embodiments of the present invention relate to capturing game environments within existing mobile, desktop, or console games, capturing live game plays, and integrating captured game environments with captured game plays to generate immersive spherical media for live-broadcast or replay in a virtual reality environment. Unlike conventional screencasts where a viewer sees only one competing player's field of view or a limited third-person view, the present invention allows users to fully immerse in the game environment and see what is happening not only around players' positions but also throughout the entire game universe, in real-time or in an off-line fashion. Thus, embodiments of the present invention enable users to watch a game play in immersive first-person or third-person views, to experience and re-experience game plays and landscape or player details from multiple perspectives, and to review the effectiveness of maneuver techniques and gaming strategies.

From a computing perspective, one advantage of the present invention is to provide high-quality immersive VR content for live-streaming or playbacks with minimal modifications to existing source games, minimal performance impacts on source game plays, in real-time or in an off-line fashion, and minimal data transmission overheads. Systems as disclosed herein achieve such features by replicating source games and source game plays in backend servers with high-level computational and graphical processing capacities, and capturing game environment as well as game plays within the backend servers for spherical video generation.

More specifically, even though game scenes often contain textures that are highly repetitive, high-definition image rendering is implicitly resource intensive. Thus, it is counterintuitive to render or generate full scenes outside a player's limited field of view during a game play, especially on resource-limited devices such as smartphones. High-definition game video recordings also impose bandwidth and delay constraints when recorded game play videos are uploaded from end user devices to stream servers. Embodiments of the present invention tackle these issues by shifting processing workload away from user devices to backend servers instead. By taking advantage of the limited 180-degree forward-facing horizontal field of view (FOV) of the human vision, embodiments of the present invention render and capture, on the backend server, game environments outside the player's FOV and/or outside game spaces where live game actions take place. Likewise, game play recordings are captured live either within the backend server, or by conventional game servers, then intelligently combined with captured game environments to generate spherical media for immersive viewing in a VR environment.

In various embodiments, the server backend includes a game environment and game play capturing component, and local copies of source games with customized virtual camera arrays inserted to facilitate game environment and game play capture. A virtual camera array is a set of virtual cameras placed in a video game to capture the virtual world in a wide viewing angle. A virtual camera array includes one or more virtual cameras, each facing a different direction. Similar to physical camera arrays, a virtual camera array may be associated with a set of position coordinates to uniquely identify its location within the game universe or game world, and each virtual camera within a virtual camera array may be characterized in terms of orientation, viewing angle and focal length, zoom factor, and the like. The game environment and game play capture component positions, configures, and selects from virtual camera arrays for image and video recordings, automatically or according to user inputs. Game environments and game plays captured by individual selected virtual cameras within a selected virtual camera array may be warped or stitched together to generate spherical media for streaming and viewing in a VR environment, and virtual camera and/or virtual camera array selection may happen as a game play unfolds, thus allowing switching back and forth among different optimized perspectives, to incorporate different shots into the same broadcast stream, or to provide multiple broadcast streams with different viewing perspective to different users.

In addition, some embodiments of the present invention provide video sharing platform functionalities, where the backend server further comprises components to provide general video hosting services such as storage, on-demand replay, streaming, video searches, and user management. Further, some embodiments may comprise VR view clients or client applications for users such as broadcasters, game players and spectators to host, download, upload or browse VR content as generated by the server backend. Users may also provide inputs through VR view clients or similar control interfaces to configure parameters for game environment and game play capture. Furthermore, VR content as provided by the backend server may be viewed live or on demand through the view clients, which may in turn support both monoscopic and stereoscopic spherical media, in either slidable panorama-360 or full VR modes, depending on whether a VR headset is available. The VR view clients may also be capable of utilizing game stream and audio meta data to further enhance the immersive experience. For example, a VR view client may perform sound transformations in real-time in response to a viewing user's locomotion during VR play.

In short, embodiments of the present invention allow users to readily generate VR content from existing 2D, 3D, and VR mobile, desktop, or console games, thus leveraging the vast number of games currently available and their sheer user base to produce a significant amount of relevant VR content in a relatively short amount of time. Generating spherical media from existing non-VR games addresses the challenge of the lack of VR games, and generating spherical media from existing VR games provides additional degrees of freedom for game environment and game play review and analysis. Methods and systems as disclosed herein provide engaging immersion experiences for players and spectators alike, by allowing a user to observe game environments and game plays from new, optimized and customized viewing perspectives.

From a more technical perspective, as discussed previously, the present invention removes potential processing and memory management bottlenecks for live-rendering and recording of monoscopic or stereoscopic panorama video sequences, thus fully or partially removing the need for expensive and sophisticated graphics processing hardware on end user devices, and indirectly reducing the barrier of entry into the realm of virtual reality by both game developers and players.

SLIVER.TV is a trademark name carrying embodiments of the present invention, and hence, the aforementioned trademark name may be interchangeably used in the specification and drawing to refer to the products/services offered by embodiments of the present invention. The terms SLIVER.TV and SLIVER may be used in this specification to describe the overall game recording, and virtual reality replaying and streaming platform, as well as the company providing said platform. With reference to the figures, embodiments of the present invention are now described in detail.

System Architecture

FIG. 1 shows a schematic diagram of a network configuration 100 for practicing one embodiment of the present invention. One or more user devices may be connected to a SLIVER server 197 or a game server 196 through different types of network communication links. Such user devices may be operated by users such as observing game spectators, or game players and broadcasters who stream or commentate game playthroughs for VR broadcasting over the SLIVER platform. In various embodiments, such user devices may be a personal computer 110, a mobile device 120, a game console 130, a VR headset 140, a smart TV 150, or the like. Mobile device 120 may be a laptop computer, a tablet, a smartphone, or wearable devices such as a watch or smart glasses. Game console 130 may be a dedicated gaming device such as a home video game console or a handheld game console. VR headset 140 is a head-mounted device capable of recording user head and body movements during game play. For example, it may be a dedicated high-end device such as Oculus Rift or Sony PlayStation VR; it may alternatively be a low-end device such as Google Cardboard or Daydream or Samsung Gear VR, to be used concurrently with a smartphone. Smart TV 150 may be a television set or set-top box with integrated processing and networking capabilities, where software applications are pre-loaded into the device. Some exemplary set-top boxes currently available today include AppleTV, Hulu Box, and Mibox. Communication links 115, 125, 135, and 145 may be wireless or wired, and may employ technologies and protocols comprising Ethernet technology, Local Area network (LAN), Wide Area Network (WAN), an optical network, and the like.

In some embodiments, each of user devices 110, 120, 130, 140 and 150 may capture game metadata, or visual and non-visual recordings of source game plays, for upload to SLIVER Server 197, possibly through game server 196, while also allowing VR viewing of processed spherical media, as downloaded from SLIVER server 197. Game metadata or game stream metadata of a source game play may be used by SLIVER Server 197 to configure a local game play within the server to replicate the source game play for game play recording within SLIVER server 197. Such game play recordings may be combined or stitched with game environment recordings captured by SLIVER server 197 to generate spherical media for viewing through user devices such as 110, 120, 130, 140, or 150.

In some embodiments, each of user devices 110, 120, 130, 140 and 150 may perform source game play video recording directly through an SDK-based capture client on the user devices, for upload to SLIVER server 197, possibly through game server 196, and for combination with game environment recordings to generate spherical game media. A Software Development Kit (SDK) is a set of software development tools or programming packages for creating applications for a specific platform. An SDK may be compiled as part of the developed application to provide dedicated interfaces and functionalities. Alternatively, an SDK may be an individually compiled module, incorporable into an existing game on a user device as a plug-in, add-on, or extension in order to add specific features to the game without accessing its source code. Thus, an SDK-based capture client may be integrated into existing 2D, 3D or VR mobile, desktop, and console games during the game development stage; alternatively, an SDK-based capture client may be individually compiled and incorporable into an existing game. The capture client utilizes one or more virtual cameras constituting one or more configurable virtual camera arrays capable of recording a game from various directions during real-time game play. Video thus recorded are either monoscopic or stereoscopic, with possible view synthesis through the SLIVER server later. An SDK-based capture client developed according an embodiment of the present invention may be able to record from multiple directions within the game universe in real-time without significantly compromising the frame rate of the source game play on a user device. For example, capture performance may be optimized by recording at low resolution and/or low frame rate, or low spatial and/or temporal frequencies, while video post-processing may be performed on the SLIVER to interpolate and/or upscale into high-definition recordings. In addition, an SDK-based capture client may collect training data for use by the SLIVER server, possibly without noticeable impact on the spatial resolution and frame rate of the source game play.

Game server 196 represents a conventional server for hosting one or more single player or multi-player computer video games, and may be directly connected to user devices such as 110, 120, 130, 140, 150, as well as SLIVER server 197. Thus, in some embodiments, game metadata from individual game plays may be produced by game server 196 instead of the end user devices, and uploaded to SLIVER server 197 directly. In some embodiments, game server 196 may also comprise SDK-based capture clients for direct game play video recording. In FIG. 1, game server 196 is shown as a remote server or cloud server for illustrative purposes only. In various embodiments, game server 196 may be any conventional server for hosting computer games, may reside on any type of networked devices, and may employ any communication networking technologies and protocols such as the Internet, TCP/IP, Local Area networks (LAN), Wide Area Networks (WAN), and the like. Furthermore, for multi-player games, each participant may be a client such as user devices shown in FIG. 1, a dedicated server such as game server 196, or a combination of client and server at the same time. In a multi-player game without a dedicated server such as game server 196, one of several players running the game may act as a server to the game, and manages the network state and network connections within the game. Thus, in some embodiments, dedicated game server 196 may be absent, and appropriate network connections may be made by individual user devices to any user device that serves as a game server instead. Game metadata and/or game play recordings may be produced and uploaded to SLIVER server 197 accordingly.

SLIVER server 197 is a platform for processing game metadata and/or game play recordings produced from source game plays of source computer games. It also conducts game environment capture, spherical media generation, and other functionalities such as view synthesis and spherical media storage and streaming. In the present disclosure, a source computer game refers to a mobile, desktop, or console game that lacks spherical video output, or an existing VR game that do not provide functionalities for game environment capture, apart from recording an active player's limited field of view. Copies of a source computer game may be installed in individual user devices, in conventional game servers, or in a SLIVER server such as 197. A source game play is a game play run on a user device or a game server, and is desired to be recorded, streamed, or replayed. A local game play is a game play on a SLIVER server, configured and/or replicated from game metadata or game recordings of a source game play. As game metadata are generally much smaller in size than high resolution video recordings, game metadata can be easily uploaded to a SLIVER server without imposing constraints on resources such as bandwidth and battery life of a user device on which the source game play takes place. The SLIVER server may then perform high resolution video recording from the local game play, and combine resulting game play recordings with game environments previously and/or concurrently captured within the server to generate spherical media output.

In FIG. 1, SLIVER server 197 is directly connected to game server 196, which may in turn be connected to user devices 110, 120, 130, 140, 150, or the like. Alternatively, SLIVER server 197 may function as a game server as well to host game plays. As a result, game plays may be recorded directly with or without game metadata in different embodiments. In addition, in some embodiments, SLIVER Server 197 may be a distributed system, where constituent controller, algorithmic components, graphical processing units, and media storage and streaming services are implemented on physically or logically separate devices. SLIVER Server 197 may also be hosted in the cloud. In terms of spherical media distribution upon their generation, monoscopic or stereoscopic spherical media produced by SLIVER Server 197 may be downloaded to any of the above mentioned user devices 110, 120, 130, 140, and 150, for live viewing or on-demand replay through a view client application installed therein. While VR headset 140 provides a fully immersive VR environment, each of user devices 110, 120, 130 and 150 may allow VR viewing in slidable panorama-360 mode instead. Furthermore, in some embodiments, SLIVER server 197 is connected to one or more viewing devices with a SLIVER VR client application installed. For example, such a viewing device may be a smart TV 160, a mobile device 170, a personal computer 180, a VR headset 190, or the like. In some embodiments, smart TV 160 is connected to a set-top box such as an Apple TV or a Hulu box, which hosts view client applications instead. Again, communication links 165, 175, 185, and 195 between SLIVER server 197 and the various viewing devices may be wireless or wired, and may employ technologies and protocols comprising Ethernet technology, Local Area network (LAN), Wide Area Network (WAN), an optical network, and the like.

Figure 2:
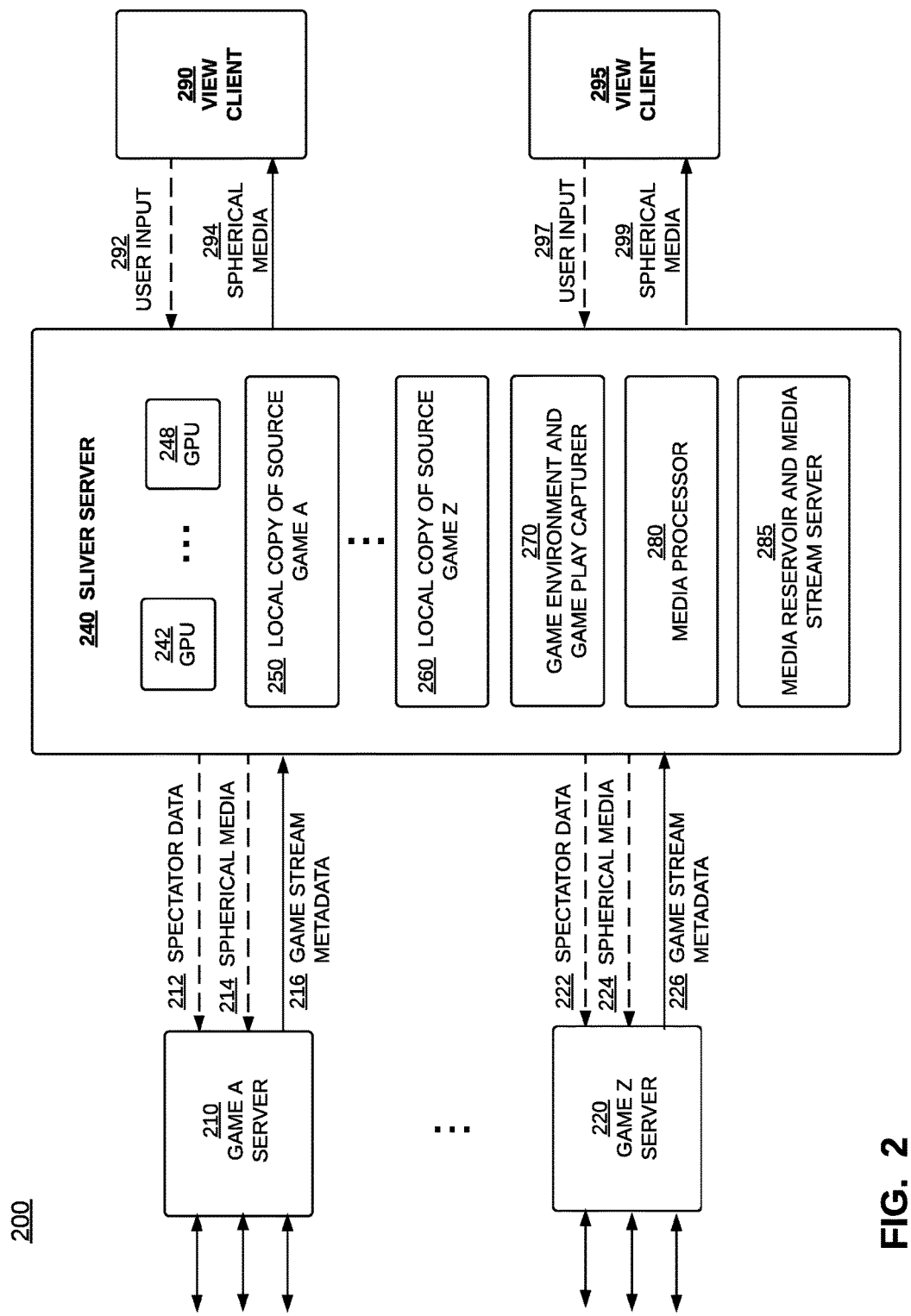
FIG. 2 is an architectural overview of a game video VR streaming framework, according to one embodiment of the present invention.

FIG. 2 is a schematic diagram showing an architectural overview 200 of a game video VR streaming and replay framework, according to one embodiment of the present invention. In this embodiment, a SLIVER server 240 is connected to one or more game servers such as 210 and 220, and one or more view clients such as 290 and 295. SLIVER server 240 comprises one or more dedicated graphical processing units 242 and 248, local copies 250 and 260 of one or more source games, a game environment and game play capturer 270, media processor 280, and components for general media hosting services such as media reservoir and media stream server 285. In some embodiments, additional services such as user login and management, and video search, ranking, rating, and commenting, are also provided through server 240. In some embodiments, game environment and game play capturer 270 is integrated with local copy 250 of source game A, such that video may be rendered in VR mode directly, and media processor 280 may become optional.

Game servers 210 and 220 may host source computer games and produce game metadata 216 and 226 of source game plays for upload to SLIVER server 240. As previously discussed, the present invention as illustrated by system architecture 200 produces spherical videos for VR streaming and replay with minimal modifications to existing source games, minimal performance impacts on source game plays, in real-time or in an off-line fashion, and minimal data transmission overheads. Accordingly, uploading conventional game stream metadata from the game servers to the SLIVER server allocate the processing workload to the server backend 240. Game metadata or game stream metadata may be complete or segmented action logs or demo files containing recorded events of a source game play, and may be replayed in-game to regenerate the source game play as a local game play, local to SLIVER server 240. In the present disclosure, we use the term game metadata to broadly refer to any data upload to a SLIVER server from game servers or individual devices on which games are played. Game metadata may also be edited by SLIVER server 240, for example, in response to user inputs 292 and 297, to help configure the local game play and recording characteristics such as virtual camera angles and virtual camera array selections. In addition, optional spectator data 212 and 222 may be downloaded from SLIVER server 240 to game servers 210 and 220; for example, to configure game stream metadata 216 and 226 according to spectator privileges.

In the present disclosure, a source computer game may be a mobile, desktop, or console 2D or 3D game played in first-person or third-person perspectives, and may lack spherical video output. Some examples of such source computer games include first-person shooter games Counter Strike and Call of Duty, online battle arena games League of Legends and Dota 2, and sandbox game Minecraft. Several existing games offer killcam and deathcam functionalities to show a player's death from a killer's perspective, or to show a killer's state upon a player's death. Nonetheless, both provide only limited video sequences with limited field of views, without spherical video output for a viewing user to explore. In some other embodiments, a source computer game may be an existing VR game with spherical video output, to be played in immersive mode with a simple or a professional VR headset. Generally, VR games are played in a first-person perspective, where a player's locomotion is detected and incorporated into the corresponding monoscopic or stereoscopic VR display during a game play, so a player experiences simulated vision, hearing, and haptic feedbacks firsthand. Nonetheless, as virtual cameras in VR games generally track an active player only, game viewers such as broadcasters and spectators are often unable to watch the game play from other optimized or customized viewing perspectives. The SLIVER platform as disclosed herein expand such limited fields of views or limited viewing perspectives by capturing game environments and game plays from other pre-determined or user-configured virtual cameras and virtual camera arrays, thus allowing game viewing from new, optimized and customized perspectives. Resulting spherical media such as 294 and 299 may be subsequently downloaded or streamed to view clients such as 290 and 295; alternatively and optionally, spherical media such as 214 and 224 may be downloaded or streamed to game servers 210 and 220 as well.

As an illustrative example, consider a source game A hosted by game A server 210. Game stream metadata 216 of a source game play of source game A located on game A server 210 may be sent to a local copy 250 of source game A, for configuration of a local game play that replicates the source game play. Similarly, game stream metadata 226 of a source game play of a source game Z located on game Z server 220 may be sent to a local copy 260 of source game Z, for configuration of another local game play. Game environment and game play capturer 270 then records the game environment and/or local game play using one or more virtual camera arrays inserted into local copy 250 of source game A or local copy 260 of source game Z. Media processor 280 may then stitch or warp images or videos as captured by individual virtual cameras within a virtual camera array to generate output spherical media that may be viewed in a VR environment. Media reservoir and media stream server 285 stores and serves the generated spherical media for live streaming and replay through view clients 290 and 295.

A spherical video, 360 video, 360-degree spherical video, 3D-360 video, or VR video is a video recording with a 360-degree horizontal viewing angle, and possibly a 180-degree vertical viewing angle. In other words, a spherical video is an immersive video where the view in every direction is available at the same time. Thus, a viewer may see what is happening in the environment surrounding a virtual camera array in any desired viewing direction. Similarly, spherical media may refer to any visual media with a 360-degree horizontal viewing angle, and may include screenshots, slideshows, panoramic images or image sequences, and spherical videos. Spherical media may be monoscopic or stereoscopic. Spherical media may be viewed in full VR mode with a head-mounted device such as a VR headset, or in slidable panorama-360 mode on a conventional 2D or 3D viewing device. More particularly, panorama-360 mode or slidable panorama-360 mode is where spherical media are shown in panoramic form, possibly on a conventional 2D or 3D viewing device, with interactive user control enabled to direct the viewing angle horizontally or vertically. By comparison, full VR mode or 3D-360 mode is where a spherical video is shown in a fully immersive VR environment through a head-mounted device such as a dedicated VR headset, with interactive user control of the viewing angle achieved through user head and body movements. In any of the above mentioned display modes, 3D audio may be provided concurrently.

View client 290 allows a user of the SLIVER system to live-stream or replay monoscopic or stereoscopic spherical media received from SLIVER server 240 on demand. A view client may be operated by a player, a broadcaster, or a spectator. For example, an active player of game A may choose to switch from a default first-person perspective as provided by a source game to a third-person perspective as provided by a SLIVER server 240 through spherical media download 214 to a view client connected to game A server 210. A killed player may lose control of his avatar in a game play, but may still be able to select and manipulate virtual camera arrays as provided by SLIVER within the game universe to see the game play proceed from desired viewing perspectives, distances, and angles. A broadcaster may be a third party streamer or commentator who live-edits game play footage by switching among several configurable virtual camera arrays, and directly broadcasts or streams edited game play footage to end viewers or spectators, possibly in real-time. In the current disclosure, game broadcast or game streaming broadly refer to the constant delivery of spherical media content to one or more end viewers while being provided by a SLIVER server. Live-broadcast and live-streaming refer to content delivery in real-time, as game plays happen. In some embodiments, a noticeable time delay in terms of seconds or minutes may be present during a live-broadcast or live-stream. Although not shown explicitly in FIG. 2, broadcasters may also be able to access virtual camera arrays through other types of control interfaces local to or remotely connected to SLIVER server 240. Furthermore, spectators watching game plays through view clients may be able to select and switch among multiple virtual camera arrays, through optional user input upload such as 292 and 297 to SLIVER server 240.

In various exemplary embodiments, view clients such as 290 and 295 may replay spherical media in either slidable panorama-360 mode through a personal computer, a mobile device, a smart TV or the like, or in full VR mode with a high-end VR headset or a low-end VR headset. Exemplary high-end VR headsets include Oculus Rift and Sony PlayStation VR, while exemplary low-end VR headsets include Google Cardboard or Daydream and Samsung Gear VR. Depending on the display format requested by each view clients, output spherical media delivered by SLIVER server 240 may be screenshots, slideshows, panoramas, or spherical videos. In some embodiments, spherical media output from SLIVER server 240 are accompanied by meta data useful for audio recovery and additional video post-processing by the view clients.

In some embodiments, a view client such as 290 or 295 is a standalone application dedicated to VR streaming and replay of spherical media. For example, it may be a mobile client application installed on a smartphone, or a display module loaded into a PC or game console connected to a VR headset. In some other embodiments, a view client is a plug-in, add-on, or extension to an application such as a web browser or a video game emulator, a gaming platform such as PlayStation or Xbox, a content-sharing platform such as Twitch or Facebook, or any other similar software or portals that may be used to distribute and view spherical media served by SLIVER server 240. In yet some other embodiments, a view client is a conventional general purpose video sharing platform such as YouTube, Vimeo, Youku, and Bilibili, which may support content viewing in slidable panorama-360 mode.

Figure 3:
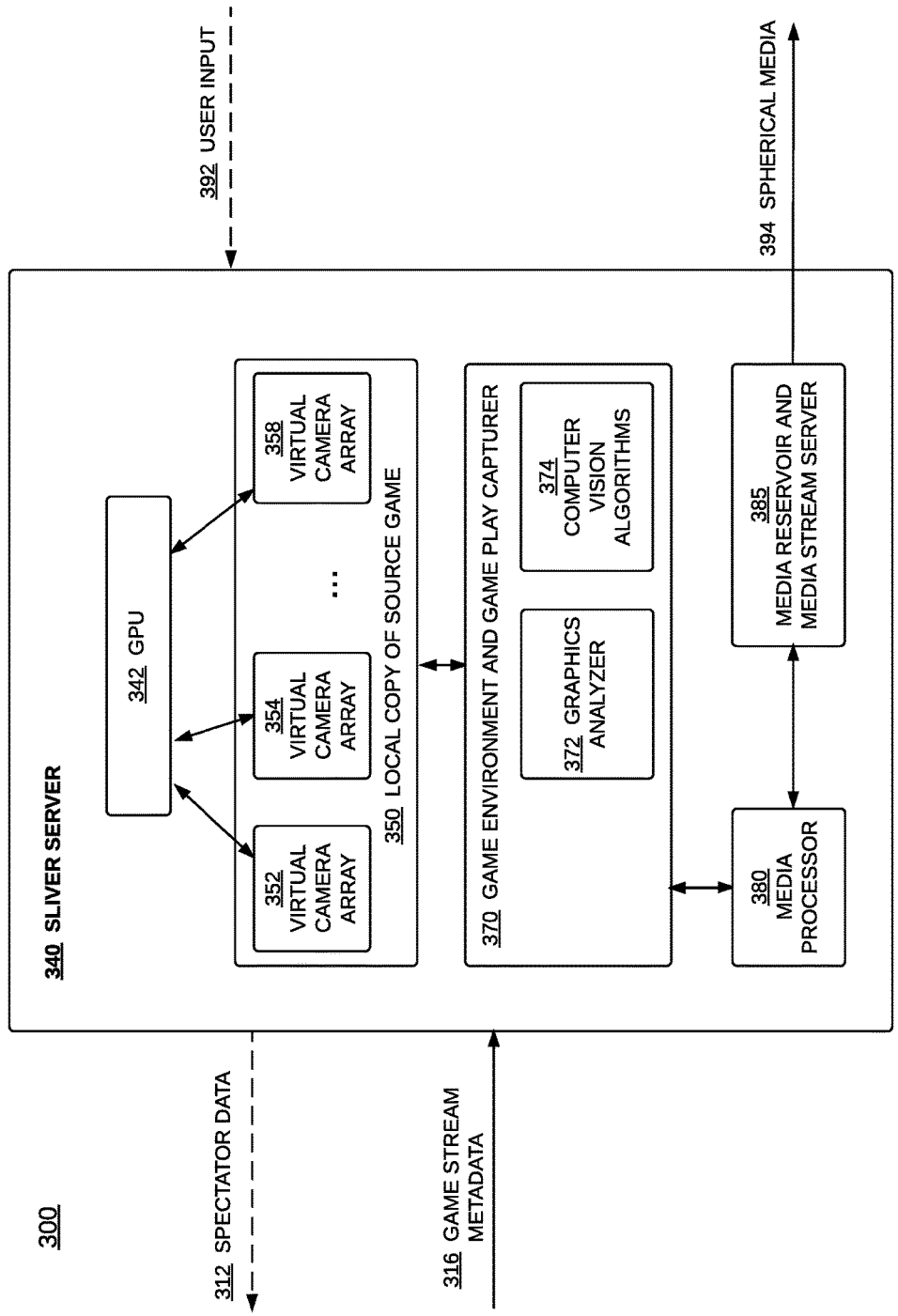
FIG. 3 is a schematic diagram showing the overall architecture of a server for spherical game video generation and streaming, according to one embodiment of the present invention.

FIG. 3 is an illustrative schematic diagram showing the overall architecture 300 of a SLIVER server 340 for spherical game video generation, streaming, and replay, according to one embodiment of the present invention. In this particular embodiment, game stream metadata 316 recorded from a source game play of a source computer game is uploaded to SLIVER server 340, and fed into a local copy 350 of the source game to configure a local game play that replicates the source game play. Optional spectator data 312 may be downloaded from SLIVER server 340; for example, to configure game stream metadata according to spectator privileges. Local copy 350 of the source game may include one or more virtual camera arrays 352, 354 and 358, controlled by game environment and game play capturer 370 to produce visual or non-visual recordings of the game environment as well as the local game play. Recordings made through each virtual camera array may be processed by a dedicated graphical processing unit (GPU) 342. For legibility, GPU 342 is shown as connected to individual virtual camera arrays only in FIG. 3. Nonetheless, in various embodiments, GPU 342 may be connected to and controlled by game environment and game play capturer 370, and/or media processor 380. The combination of GPU 342, local copy 350 of the source game, and game environment and game play capturer 370 may be viewed as a game connector module, which is a conversion tool that transforms input visual or non-visual game recordings such as CounterStrike demo files into video recordings that resemble those created by an SDK-based capture client, in real-time or in an off-line fashion.

In this disclosure, a captured game play refers to visual recordings that contain player actions as well changes to game scenes, maps, or terrains. It may also refer to conventional 2D, 3D or VR visual recordings with limited field of views. For example, a captured game play for a shooter game may include avatar movements, grenade projectiles, smoke trails, bullet holes, broken structures, glasses and the like. By comparison, a captured game environment refers to visual recordings that remain static or undergo minimal changes during some portion of a game play. Thus, in some embodiments, the entire game environment may be pre-rendered and pre-captured, even before a source game play is uploaded to SLIVER server 340 for local game play reproduction. For example, given a set of virtual camera arrays 352, 354, and 358, with each located at pre-determined, fixed positions within the virtual game world, every virtual camera array may record multiple static image or video sequences that when stitched together by media processor 380, depict the game environment with a 360-degree horizontal viewing angle, and possibly a 180-degree vertical viewing angle. Subsequently, when game stream metadata 316 become available for a local game play production and broadcast, one or more cameras within at least one available virtual camera arrays may be activated to capture the corresponding local game play, and the captured local game play may be combined with or stitch to the recorded game environment, by replacing game environment recordings taken by the game-play activated virtual cameras with recorded game play videos.

For example, each of virtual camera arrays 352, 354, and 358 may include six virtual cameras, with each virtual camera facing a different direction, and all three virtual camera arrays may be employed to capture the game environment from different virtual camera array positions within the game universe. In a first instance, a local game play may fall into the field of view of a single virtual camera within virtual camera array 352. As a result, only this particular virtual camera within virtual camera array 352 is activated to capture the game play. The captured game play recordings may then be stitched or warped with game environment captured by the other five virtual cameras within virtual camera array 352 to produce a spherical game video around the corresponding virtual camera array location, to be stored in media reservoir and media stream server 385, and broadcasted as spherical media 394. In a second instance, as a game play proceeds and as a player avatar moves from one area of a game map to another, a local game play may fall concurrently into the fields of view of one or more virtual cameras within virtual camera arrays 352, 354, and 358. Correspondingly, the system may utilize graphics analyzer 372 and/or computer vision algorithms 374 to automatically and intelligently activate virtual cameras that overlook or "see" the game play in action, and select and switch among all three virtual camera arrays, or among the virtual camera arrays that contain activated virtual cameras, based on an optimized, best viewing perspective for the game play. In some embodiments, graphics analyzer 372 may analyze the locations of available virtual camera arrays within a given game map or mini-map, game map contents, and instantaneous game play characteristics such as player positions and player movement directions to determine an optimal virtual camera and/or virtual camera array selection. Computer vision algorithms 374, on the other hand, may analyze conventional 2D or 3D video recordings within a given player's field of view to determine optimized viewing perspectives and optimal virtual camera or virtual camera array selections. For example, computer vision algorithm 374 may recognize a building within the player's field of view, and select a virtual camera array located on top of the building for game play capture and spherical media generation. Once captured, game play recordings may be processed by GPU 342 and media processor 380, and stitched to game environment captured by other virtual cameras in the same virtual camera array. For live-streaming and later replay, a spherical video thus generated may be stored in media reservoir and media stream server 385 as it is produced, and broadcasted to users as spherical media 394.

In some embodiments, game environment is captured by a first subset of virtual cameras within a virtual camera array, and game play is captured by a second subset of virtual cameras within the virtual camera array, where the two subsets may overlap but are not equal to each other. Media processor 380 may then select game environment recordings captured by virtual cameras not in the second subset, for combination with or stitching to game play recordings captured by virtual cameras in the second subset. In addition, in some embodiments, the stitching process by media processor 380 includes conventional image or video processing and stitching techniques such as upscaling, interpolation, calibration, alignment, or projection, especially when recordings with different spatial or temporal frequencies are combined. In some other embodiments, the stitching process involves photo or video montage techniques where recordings are cut and merged into a single spherical media stream.

In some embodiments, an optional user input 392 is uploaded to SLIVER server 340. A user is a person or a device that interacts with the SLIVER system, and may represent a broadcaster, a player, or a spectator of a computer game. As shall be discussed with respect to FIG. 6, optional user input 392 may contain user information and privileges, and interactive virtual camera array selection and configuration parameters. Such virtual camera array selection and configuration parameters may be used by SLIVER server 340 for selecting one or more available virtual camera arrays for game environment and game play capture, and for an ensuing spherical media streaming process.

Figure 4:
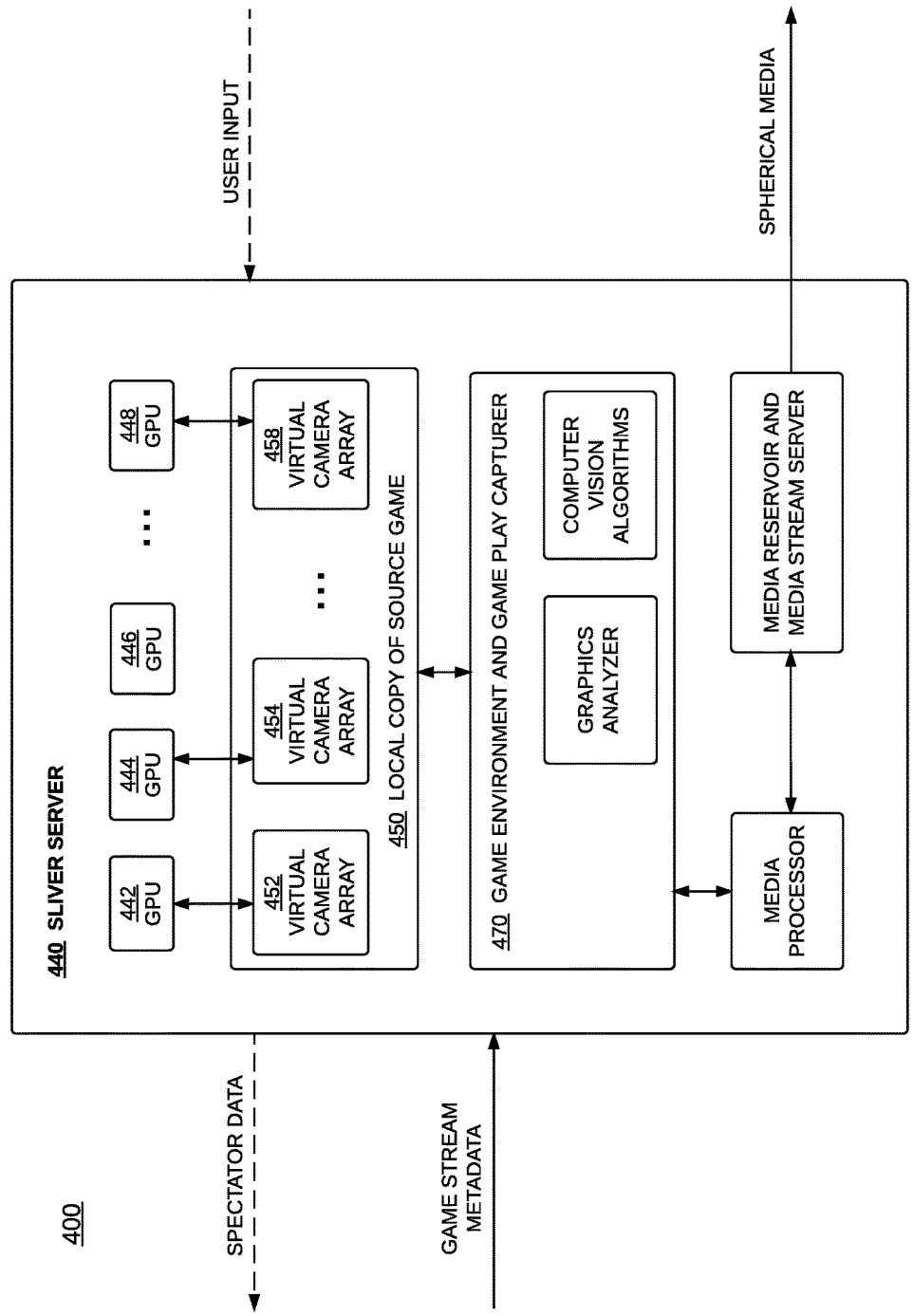
FIG. 4 is another schematic diagram showing the overall architecture of a server for spherical game video generation and streaming, according to another embodiment of the present invention.

FIG. 4 is another schematic diagram showing the overall architecture 400 of a SLIVER server 440 for spherical game video generation, streaming and replay, according to another embodiment of the present invention. Similar to server 340, server 440 hosts one or more local copies of source games such as 450, and employs a game environment and game play capturer 470 to control one or more virtual camera arrays 452, 454, and 458 embedded in the local copy 450 of the source computer game. Unlike server 340, however, server 440 employs more than one physical or logical GPUs to process visual data captured by individual virtual camera arrays. In this particular example, GPUs 442, 444, and 448 correspond in a one-to-one relationship to virtual camera arrays 452, 454, and 458, thus game environment and game plays captured by different virtual camera arrays may be handled concurrently by individual GPUs, and shots from more than one virtual camera arrays may be made available for streaming to multiple users.

Virtual Camera Arrays for Spherical Game Video Generation

Figure 5B:
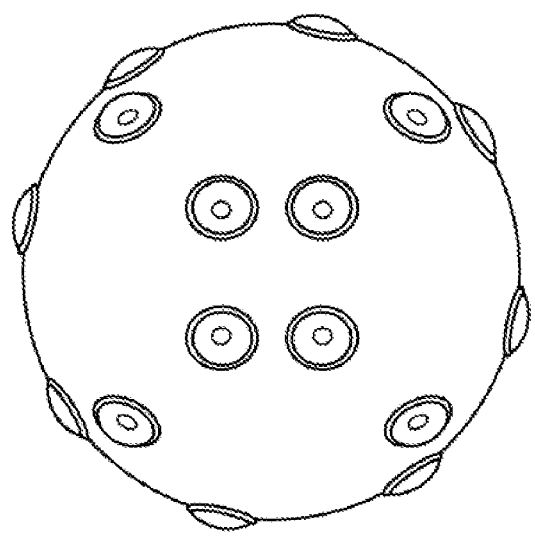
FIG. 5B is another illustrative example of a virtual camera array arrangement for 360-degree capture, according to another embodiment of the present invention.
Figure 5A:
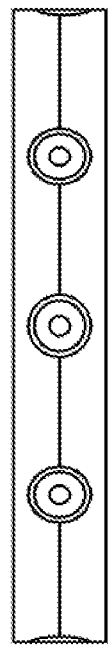
FIG. 5A is an illustrative example of a virtual camera array arrangement for 360-degree capture, according to one embodiment of the present invention.

FIGS. 5A, and 5B are diagrams of two illustrative virtual camera array arrangements for 360-degree capture, according to some embodiments of the present invention. FIG. 5A shows a circular rig arrangement 500 with eight virtual cameras, five of which are directly visible. FIG. 5B shows a spherical arrangement 550 with twenty-four virtual cameras, sixteen of which are directly visible. Each camera may have a viewing angle ranging from 45 to 170 degrees. While having a fewer number of virtual cameras such as in arrangement 500 may be more resource efficient, having a larger number of virtual cameras such as in arrangement 550 may reduce distortion captured by each camera. In various embodiments, a virtual camera array utilized by game environment and game play capturer 370 or 470 may be user configurable, and may include any number of virtual cameras arranged in any geometric shape, with each camera orientated in any desired direction. Unlike real-world camera arrays which are limited by camera form factors, virtual camera array arrangements are only limited instead by computing resources such as the number of processors available, processing speed, throughput, or data transmission bandwidths.

More specifically, each virtual camera within a virtual camera array may be characterized in terms of spatial and temporal capture frequencies, orientation, viewing angle and focal length, zoom factor, and the like. Such virtual camera characteristics may be automatically adjusted before or during a local game play by the SLIVER platform. In some embodiments, virtual cameras within a virtual camera array are operated synchronously, with the same capture resolution and frame rate, or spatial and temporal frequencies. In some other embodiments, virtual cameras within the same virtual camera array may be configured individually to operate under separate resolution and frame rate settings. For example, a front facing camera directed straight at a bombsite in a shooter game may be configured to capture at a higher resolution with double the frame rate than side-facings cameras that monitor alleyways leading up to the bombsite. A temporal frequency of 0 may refer to a single image capture, before a game play takes place, or at a given instant in a live game play. Each virtual camera array may be associated with a set of coordinates to uniquely identify its position or location within a game universe and its height above a reference ground level. Each virtual camera array may be positioned statically at fixed locations within the game world, may move from one fixed location to another as a game play proceeds, or may follow game-configured or user-configured discrete or continuous trajectories throughout the game play. When all virtual camera arrays are positioned at fixed locations, the setup resembles a static monitoring system. When some virtual camera arrays move throughout the game play, for example, to track player positions, the setup resembles mountable and portable action camera systems. In addition, while a single array of virtual cameras is sufficient to capturing monoscopic game videos, two arrays may be needed side by side at approximately the same location for a stereoscopic view generation, depending on whether view synthesis is performed within a SLIVER server.

In some embodiments, virtual camera and virtual camera arrays as provided by the SLIVER server may be fully user-configurable based on user inputs. For example, options may be provided for a player, broadcaster, or spectator to choose from one or more pre-defined virtual camera array arrangements and locations for game capture, to enable or disable one or more virtual cameras within a virtual camera array, to modify camera locations or orientations, or to even define personalized virtual camera arrays with customized arrangements and camera characteristics. In some embodiments, virtual camera and virtual camera array access rights are determined based on player status and/or user privileges.

For different types of source games, the number of virtual camera arrays and virtual camera array positions or locations within a game universe may vary from game to game, from game play to game play, or from one streaming user to another. As previously discussed, in some embodiments, a virtual camera array location tracks the movement of an active player's character or avatar within the game world, and configuration options may be provided by a game environment and game play capturer such as 370 or 470 to set the corresponding tracking precision. In some embodiments, a virtual camera array location tracks the movement of a spectator inserted into the game world. In yet some other embodiments, virtual camera array locations may be static or fixed, and pre-determined by the system or by a user before a source or local game play is initiated, based on the complexity of a game map, terrain configuration and architectural plans of the game world, or desired viewing perspectives. For example, in an online battle arena game with a single lane, one virtual camera array positioned above the middle or center portion of the lane may be sufficient, while multiple virtual camera arrays may be desired when multiple lanes are present. In a first person shooter game, multiple virtual camera arrays may be carefully positioned and orientated to capture game environment and game plays inside and outside different building structures. A player may configure game metadata from a source game play to limit virtual camera array numbers, positions, and similar characteristics to control spectators' access to the game play. A spectator, on the other hand, upon being granted full access, may freely move and modify virtual camera arrays for any desired viewing experience.

Furthermore, for real-world VR videos, to avoid causing motion sickness to viewers, a capturing camera needs to be stable. Similarly, simulation sickness needs to be taken into account when placing virtual camera arrays within a game universe. For virtual camera arrays that tracks user motion, a front shooting direction should remain unchanged, with shaking, jerking, or bobbing motions of the camera stabilized or smoothed out. Additionally, the movement path of a virtual camera array may be computed or interpolated explicitly to smooth out the virtual camera array's movements and rotations, thus minimizing potential dizziness when a user watches with a VR headset. For static virtual camera arrays, camera positions may be determined based on desired field and depth of view around a given game map with known terrain configurations and architectural plans, as well as other static or dynamic game or game play characteristics. For example, certain locations within a shooter game may be suitable for virtual camera array placement because they provide a birds-eye view of team movements around the map, or because it provides captivating visual effects upon the explosion of certain target structures; similarly, some locations may be unsuitable for virtual camera array placement because their closeness in distance to explosion sites may cause simulation sickness to a significant number of viewers.

Figure 6:
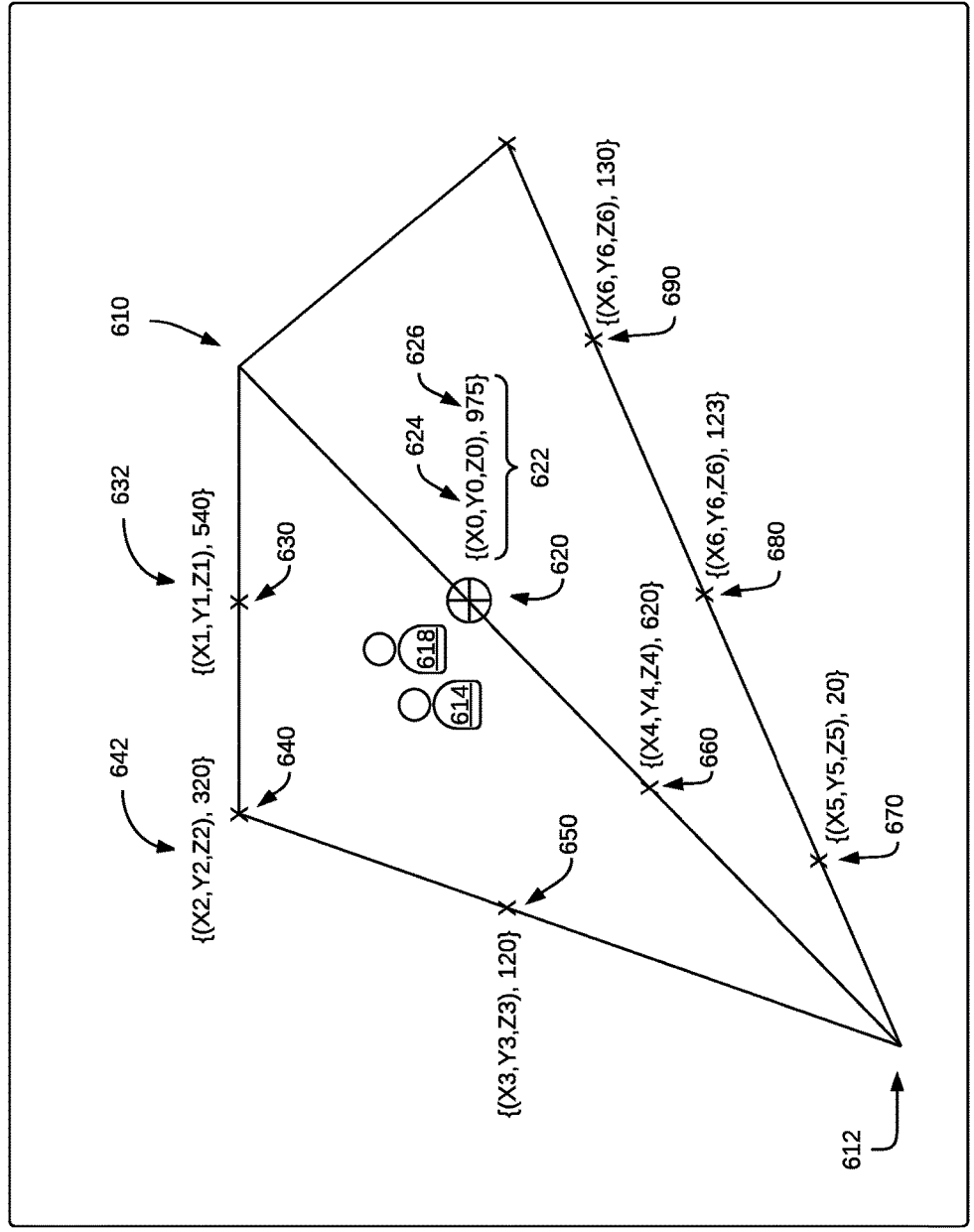
FIG. 6 is an illustrative schematic diagram showing a game map for virtual camera array placement and selection, according to one embodiment of the present invention.

FIG. 6 is a schematic diagram showing a game map or in-game mini-map 600 for camera array placement and selection, according to one embodiment of the present invention. Map 600 illustrates a game play of an online battle arena game where three paths or lanes exist between bases 612 and 610 of two opposing teams, and where two players represented by avatars 614 and 618 each tries to destroy the enemy's base. In this particular segment of the game play, players 614 and 618 meet along the middle lane to battle against each other. In this example, eight virtual camera arrays are provided by a SLIVER server, with two virtual camera arrays 620 and 660 along the middle lane, three virtual camera arrays 630, 640, and 650 along the upper lane, and three virtual camera arrays 670, 680, and 690 along the lower lane. Each virtual camera array may have different virtual camera arrangements as illustrated by FIGS. 5A and 5B. In some embodiments, a SLIVER server may employ a graphic analyzer to analyze tradeoffs between processing power and a number of virtual camera arrays to be provided, tradeoffs among different camera array positions, camera array arrangements, camera orientations and capturing frequencies, as well as other similar characteristics, to determine the number of virtual camera arrays and corresponding virtual camera array positions to provide for recording game environment and/or a game play.

In what follows, two specific examples are discussed for spherical media generation based on the game play shown in FIG. 6. In a first example, a SLIVER server analyses the game play as displayed on game map 600 to activate and select virtual cameras and virtual camera arrays for spherical media generation. In this particular example, all virtual cameras within all virtual camera arrays shown in FIG. 6 may be used to capture game environment in 360-degrees off-line, before any game play takes place. After the game play shown in FIG. 6 is initiated and proceeds, the SLIVER system may detect player positions as being within a battle field visible from virtual camera arrays 620, 630, 650 and 660, where the other four virtual camera arrays 640, 670, 680, and 690 are either obscured, or too distant to produce a game play capture with acceptable resolution and quality. In some embodiments, the SLIVER systems may further determine that virtual camera array 620 is closest to the battle field, provides a best viewing perspective for the current segment of the game play, and should be selected for game play capture. Thus, a first subset of virtual cameras within virtual camera array 620 may be activated to capture the game play as it happens in the upper left half of the game map, above the middle lane. As such game play recordings are captured, they may be processed and combined with game environment in the lower right half of the game map, below the middle lane, as previously captured by a second subset of virtual cameras within virtual camera array 620. In different embodiments, the two subsets of virtual cameras may or may not overlap, and may or may not add up to the full set of virtual cameras within virtual camera array 620, but nonetheless combine to provide a 360-degree viewing angle. In some embodiments, the second subset of virtual cameras for capturing the game play is the full set of virtual cameras, or a subset that provides a 360-degree viewing angle. Thus, game play may be captured in 360-degree directly, and no game environment capture would be necessary for generating a spherical video output.

In a second example, a SLIVER server may analyze game play as displayed on game map 600, yet also allow user input for virtual camera and virtual camera array selection for spherical media generation. After virtual camera arrays 620, 630, 650 and 660 are determined to be usable for game play capture, the SLIVER server may, for each of these four virtual camera arrays, perform game play capture using a subset of constituting virtual cameras. Thus, a subset of virtual cameras within virtual camera array 620 may capture the game play in the upper left half the game map, above the middle lane, a subset of virtual cameras within virtual camera array 660 may capture game play within the battle field in the upper right half of the game map, towards base 610, and the same applies for virtual camera arrays 630 and 660. Each set of captured game play footage may then be combined with corresponding game environment footage captured by the remaining virtual cameras in each virtual camera array, respectively, to generate 360-degree views at respective camera array locations. A spectator may then select among the four available virtual camera arrays, and the SLIVER server streams corresponding 360-degree videos for viewing in a VR environment.

In the two examples discussed above, by pre-rendering and capturing game environments, the SLIVER system may reduce real-time processing power requirement associated with each virtual camera array. In some other embodiments, all or part of the game environment may be rendered and captured in real-time as well, concurrently with game play capture. Again, within each virtual camera array, the subset of game environment capture virtual cameras and the subset of game play capture virtual cameras may overlap, but are not necessarily equal. Each subset may include all virtual cameras within the given virtual camera array as well.

Furthermore, as illustrated by the second example, when more than one virtual camera array is available for game environment and game play capture, virtual camera array selection and switching throughout a game streaming session is extremely important for providing a simulating immersion experience. In various embodiments, virtual camera array selection may be performed automatically by the system, according to user input, or using a combination of both. System selections based on optimized viewing perspectives may be determined through a graphical analysis of available virtual camera array locations within a game map with respect to one or more positions within the game map, map contents such as terrain configurations and architectural plans within the map, as well as other game viewing settings such as desired viewing distance and viewing angles. For example, virtual camera array 620 may be automatically selected by the system to capture the current battle between players 614 and 618 because it provides a shortest viewing distance and a wide viewing angle. Alternatively, camera array 630 may be selected by the system instead, to provide a larger viewing distance that may allow a more integral view of special effects associated with the battle play. By comparison, a user such as a player, a broadcaster, or a spectator may choose any one of the eight available virtual camera arrays shown in map 600 for game environment and game play capture.

FIG. 6 further illustrates virtual camera array positioning techniques and system or user-configured camera selection techniques using numerical tuples such as 622, 632 and 642, each associated with an individual virtual camera array 620, 630, and 640 respectively. In this particular example, numerical tuple 622 includes a set of position coordinates 624 with value (X0, Y0, Z0) for placing the virtual camera array 620 within the game map 600. Although game map 600 is shown in two dimensions only, coordinates 624 represent camera position in three dimensions, where the Z-coordinate Z0 indicates a height measured from a reference ground level of the game. In some embodiments, an orientation of the virtual camera array may also be indicated, for example, in terms of angle numerically measured from a direction vertical to the reference ground level. Furthermore, in this example, numerical tuple 622 also includes an indicator 626, with value 975, showing that there are 975 users watching the game play from virtual camera array 620.

EXAMPLES

Figure 7:
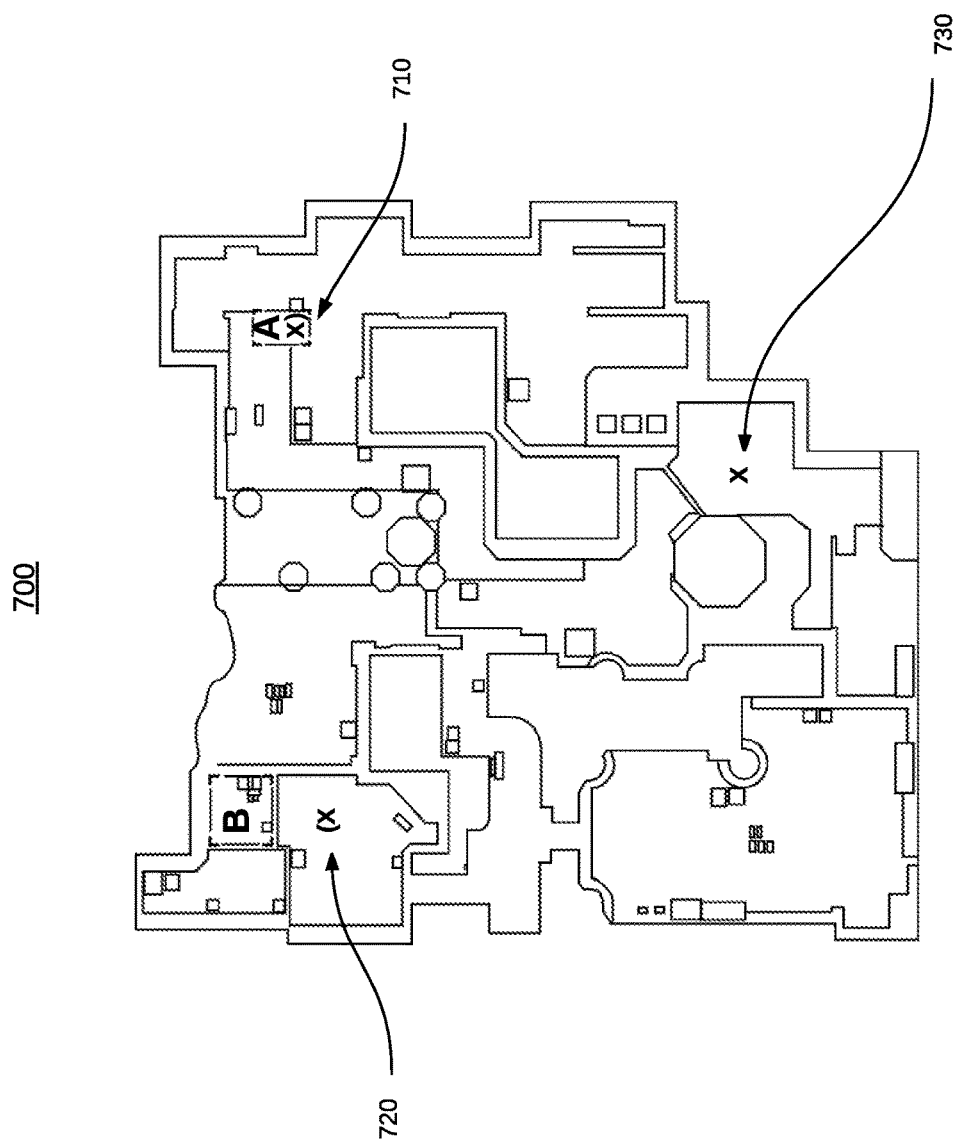
FIG. 7 is an illustrative game map for a multi-player shooter game, showing locations of virtual camera arrays for game environment and game play capture, according to one embodiment of the present invention.

FIG. 7 is an illustrative in-game Dust2 map for the multi-player shooting game Counter Strike: Global Offensive, showing locations of virtual camera arrays for game environment and game play capture, according to one embodiment of the present invention. In this particular example, three virtual camera arrays 710, 720, 730 are provided by a SLIVER server, two of which are located near bombsite A and bombsite B, as labeled accordingly in FIG. 7. Virtual camera array 730 may be provided so spectators may see more game details as well as distant perspectives for the bombsites. In this example, each virtual camera array may be associated with not only X and Y coordinates for its location, but also a Z-coordinate to indicate how far above the ground the virtual camera array is located, and possibly an orientation for a front facing virtual camera within the virtual camera array.

Figure 8:
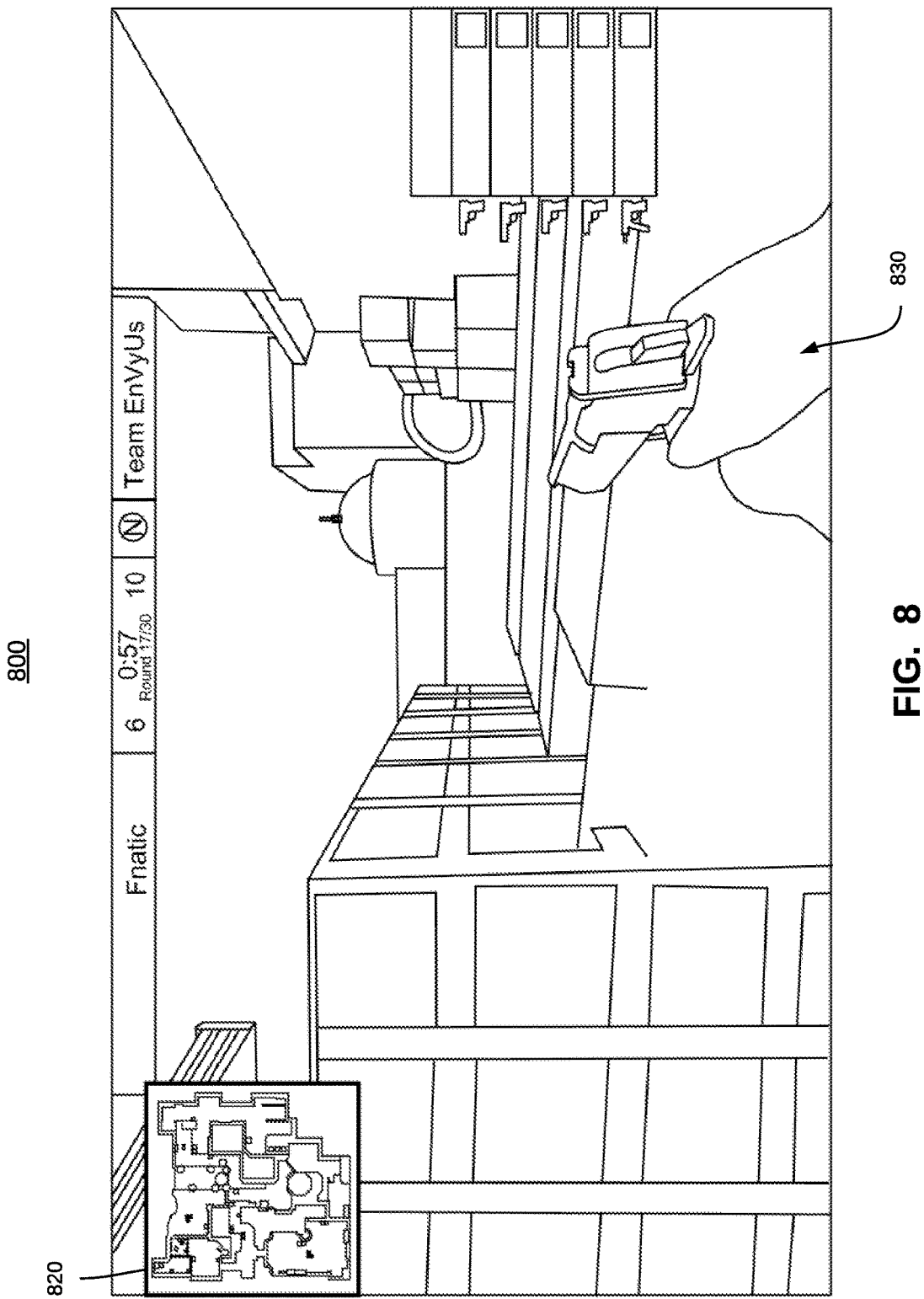
FIG. 8 is an exemplary screenshot of a 2D game broadcast of a game play of the multi-player shooter game referenced in FIG. 7, showing the field of view of a selected player, according to one embodiment of the present invention.

FIG. 8 is an exemplary screenshot 800 of a 2D game broadcast of the multi-player shooter game referenced in FIG. 7, showing the field of view of a selected player near bombsite A, according to one embodiment of the present invention. Mini-map 820 corresponds to map 700, and may be used for graphical analysis of virtual camera array locations 710, 720, and 730 relatives to selected positions such as player positions for virtual camera array selection. Screenshot 800 shows a first person perspective of a player 830 holding a handgun and shielded from enemy fire by a set of boxes on the left.

Figure 9:
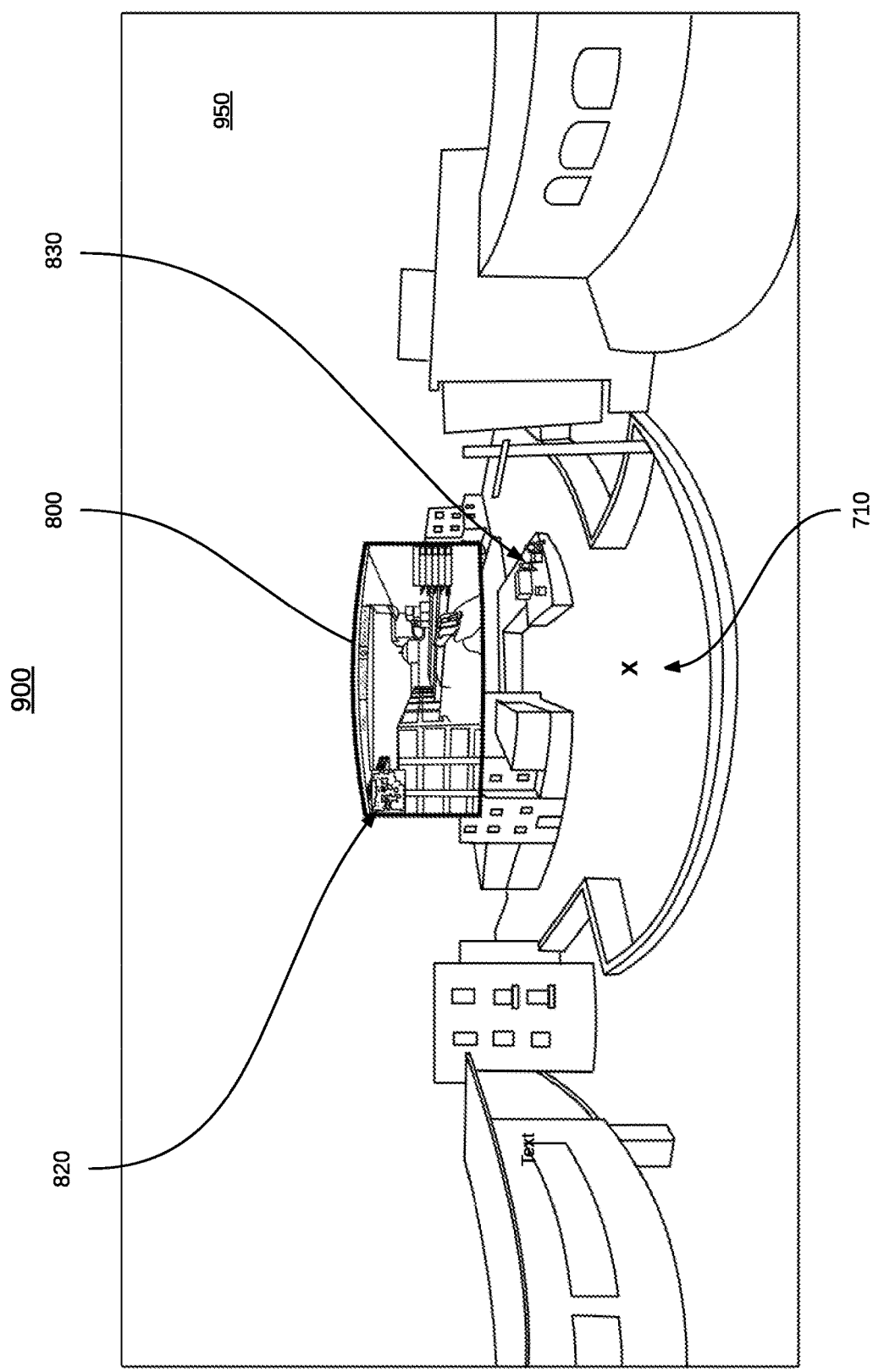
FIG. 9 is an exemplary screenshot of a spherical VR game broadcast of the game play referenced in FIG. 8, according to one embodiment of the present invention.

FIG. 9 is an exemplary screenshot of a spherical VR game broadcast of the game play referenced in FIG. 8, according to one embodiment of the present invention. In this particular example, the 2D broadcast 800 containing mini-map 820 is superimposed with the 360-degree spherical broadcast 950, as a floating broadcast screen on top. Virtual camera array 710 captures the game environment to the left, right, and back of the camera array, as well as the active game play taking place towards the front-facing direction in FIG. 9. Correspondingly, the front side of virtual camera array 710 faces right to left in FIG. 7. In addition, player 830 from FIG. 8 is seen in the spherical broadcast 950 in FIG. 9 from a third-person perspective. In this particular example, 2D broadcast 800 and the spherical video broadcast 950 are synchronized both in time and in position.

Figure 10:
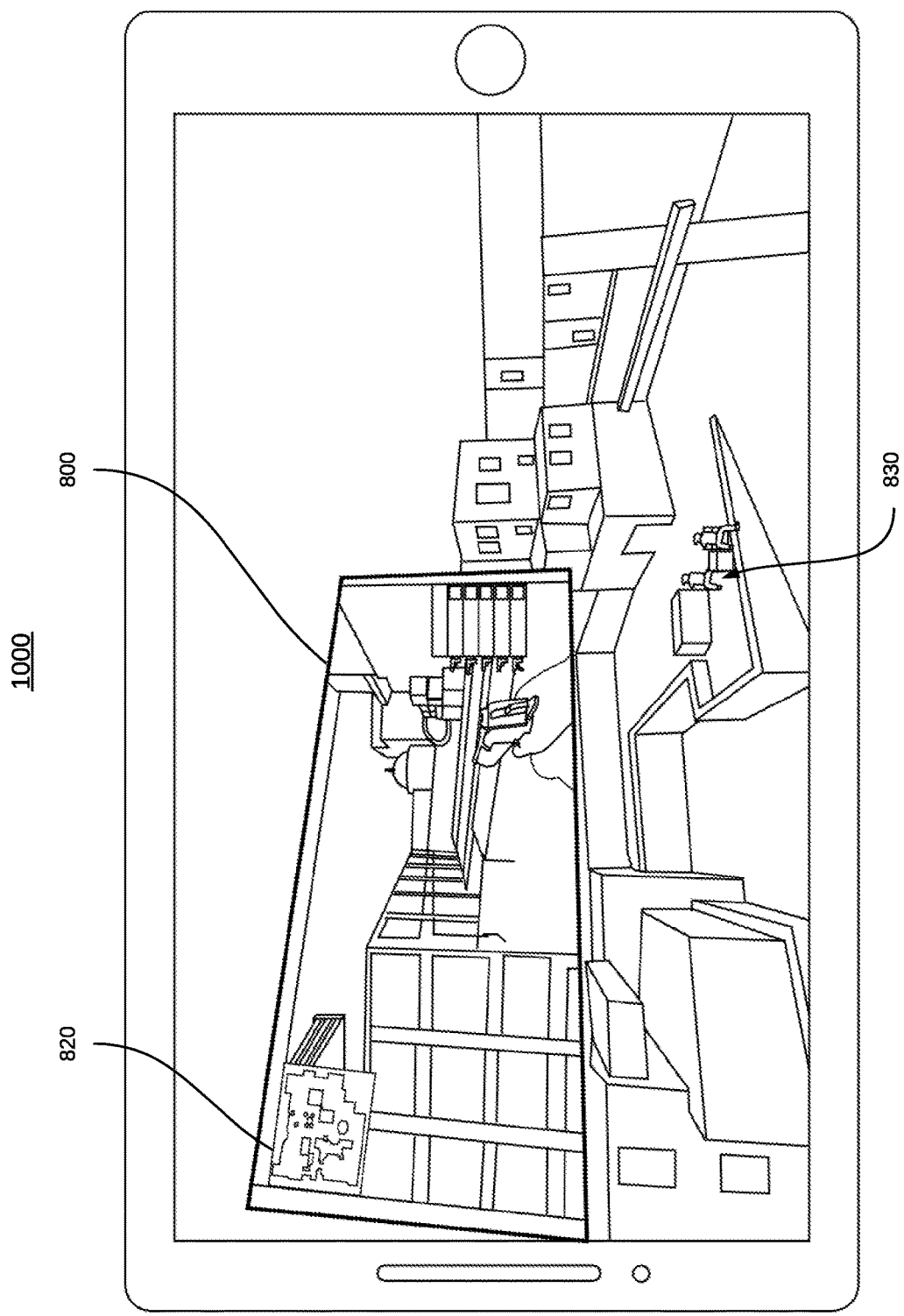
FIG. 10 is an exemplary screenshot of the spherical VR game broadcast in FIG. 9 displayed in panorama-360 mode on a mobile device, according to one embodiment of the present invention.
Figure 11:
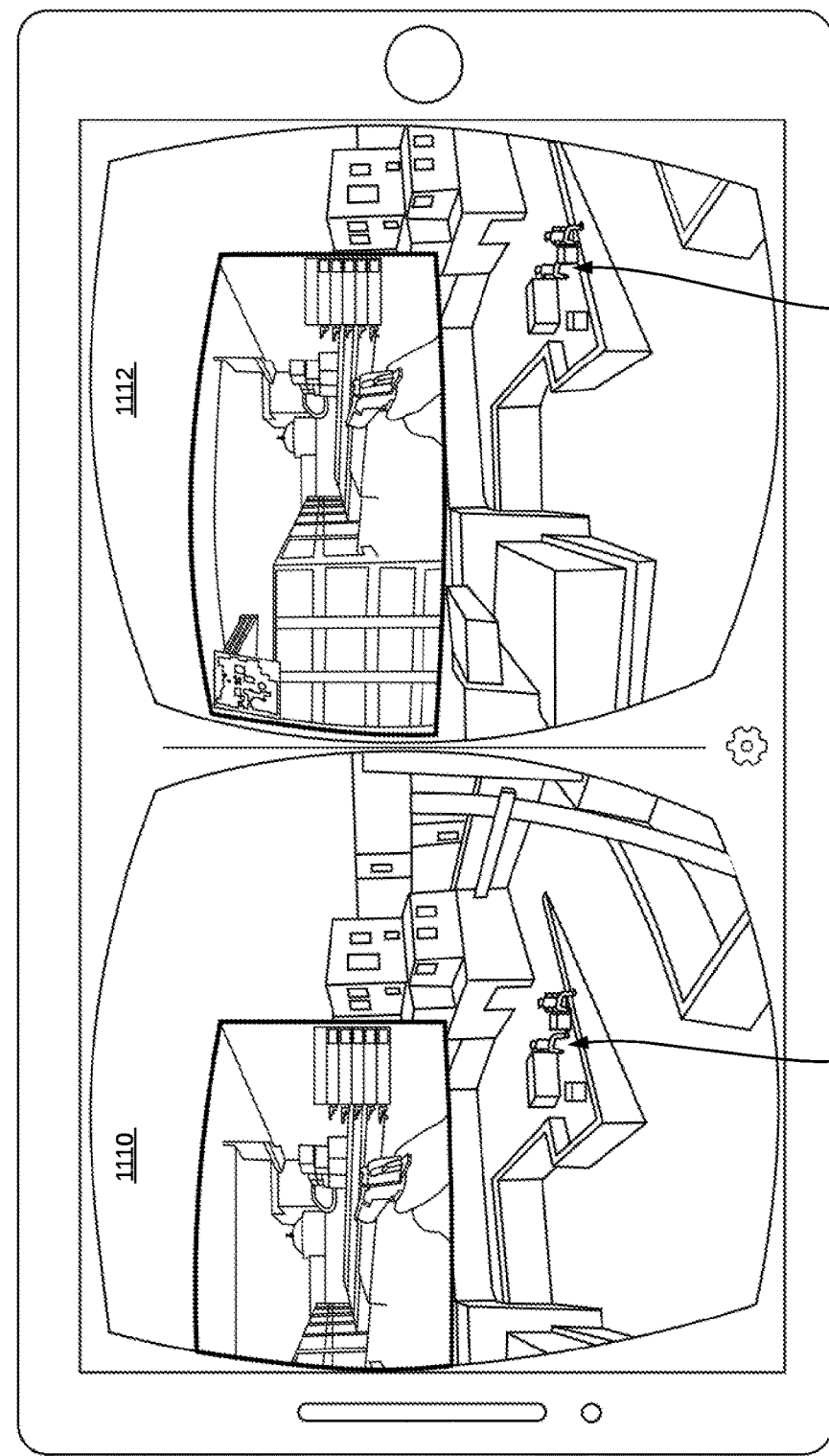
FIG. 11 is an exemplary screenshot of the spherical VR game broadcast in FIG. 9, displayed in stereoscopic panorama-360 mode on a mobile device, according to one embodiment of the present invention.

FIG. 10 is an exemplary screenshot of the spherical VR game broadcast in FIG. 9 displayed in panorama-360 mode on a mobile device such as a smartphone, according to one embodiment of the present invention. Correspondingly, FIG. 11 is an exemplary screenshot of the spherical VR game broadcast in FIG. 9, displayed in stereoscopic panorama-360 mode on a mobile device, according to another embodiment of the present invention. In FIG. 11, spherical broadcasts 1110 and 1112 are both synchronized to 2D broadcast 800, and may be view-synthesized for stereoscopic output. Similarly, players 1130 and 1132 both correspond to player 830, but are shown in slightly different viewing angles for stereoscopic output.

Figure 12:
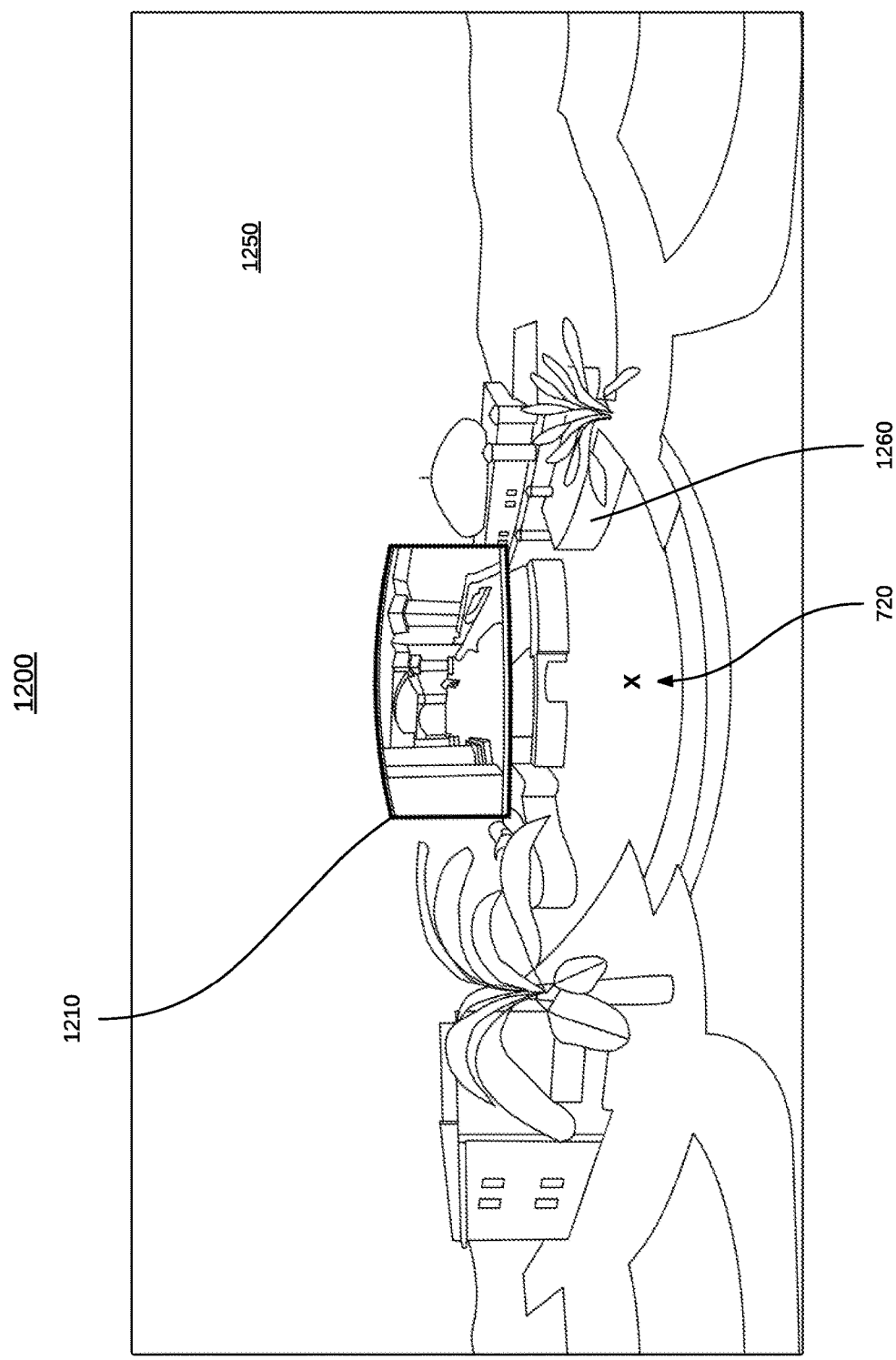
FIG. 12 is another exemplary screenshot of the spherical VR game broadcast of the game play referenced in FIG. 8, according to one embodiment of the present invention.

FIG. 12 is another exemplary screenshot of the spherical VR game broadcast of the game play referenced in FIG. 8, as captured by virtual camera array 720 near bombsite B shown in FIG. 7, according to one embodiment of the present invention. In this particular example, the player has entered the structure 1260 shown in the spherical broadcast 1250, and is not directly visible. The corresponding 2D broadcast 1210 illustrates the current field of view of the player within structure 1260. Thus, virtual camera array 720 captures the game environment to the left, right, and back of the camera array, as well as towards the front-facing direction in FIG. 12. Correspondingly, the front side of virtual camera array 720 faces left to right in FIG. 7. Accordingly, spherical broadcast 1250 comprises entirely of captured game environment recordings, as no game actions is taking placing within the field of view of virtual camera array 720.

Figure 13:
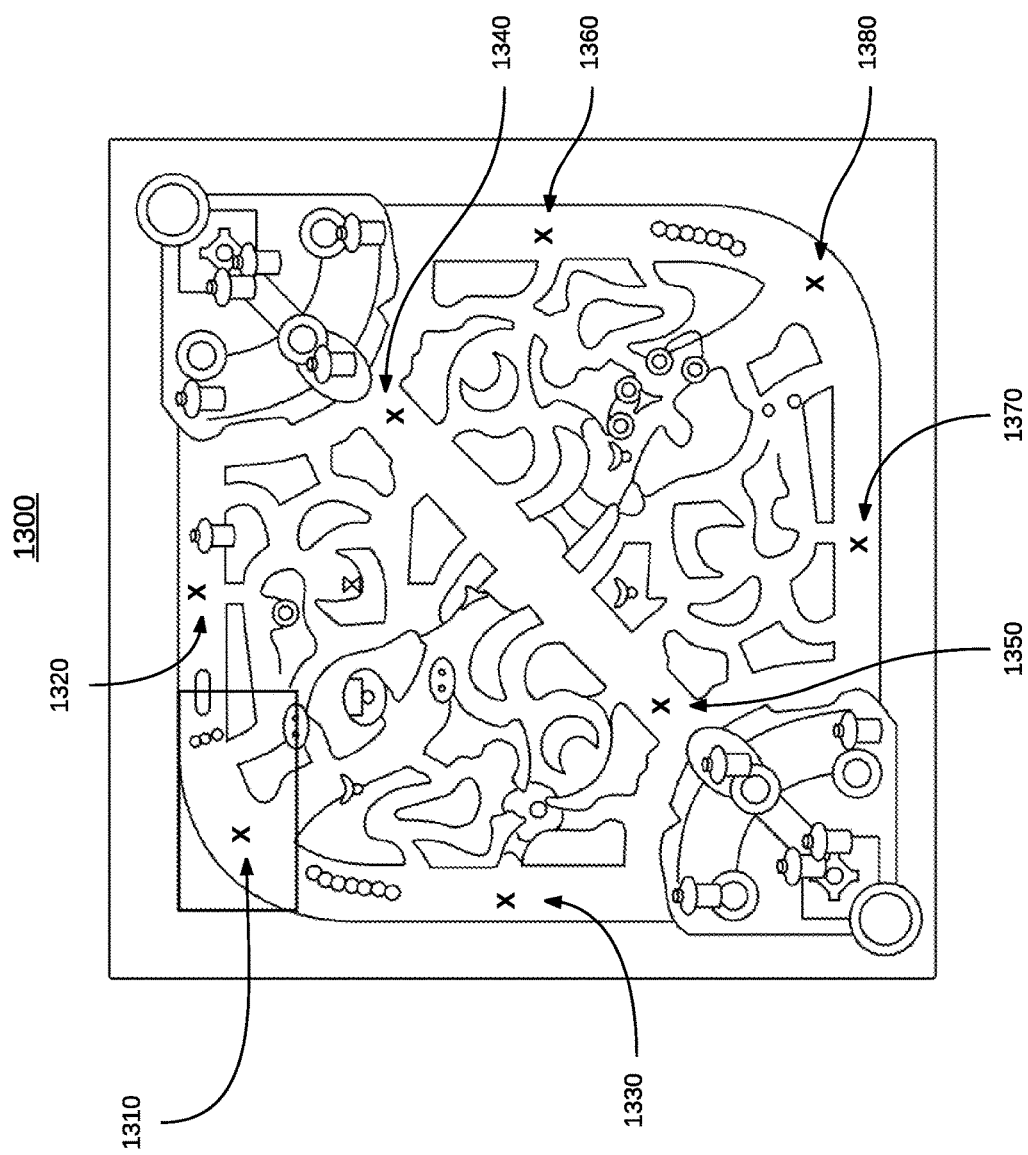
FIG. 13 is an illustrative game map for a multi-player online battle arena game, showing locations of virtual camera arrays for game environment and game play capture, according to one embodiment of the present invention.
Figure 14:
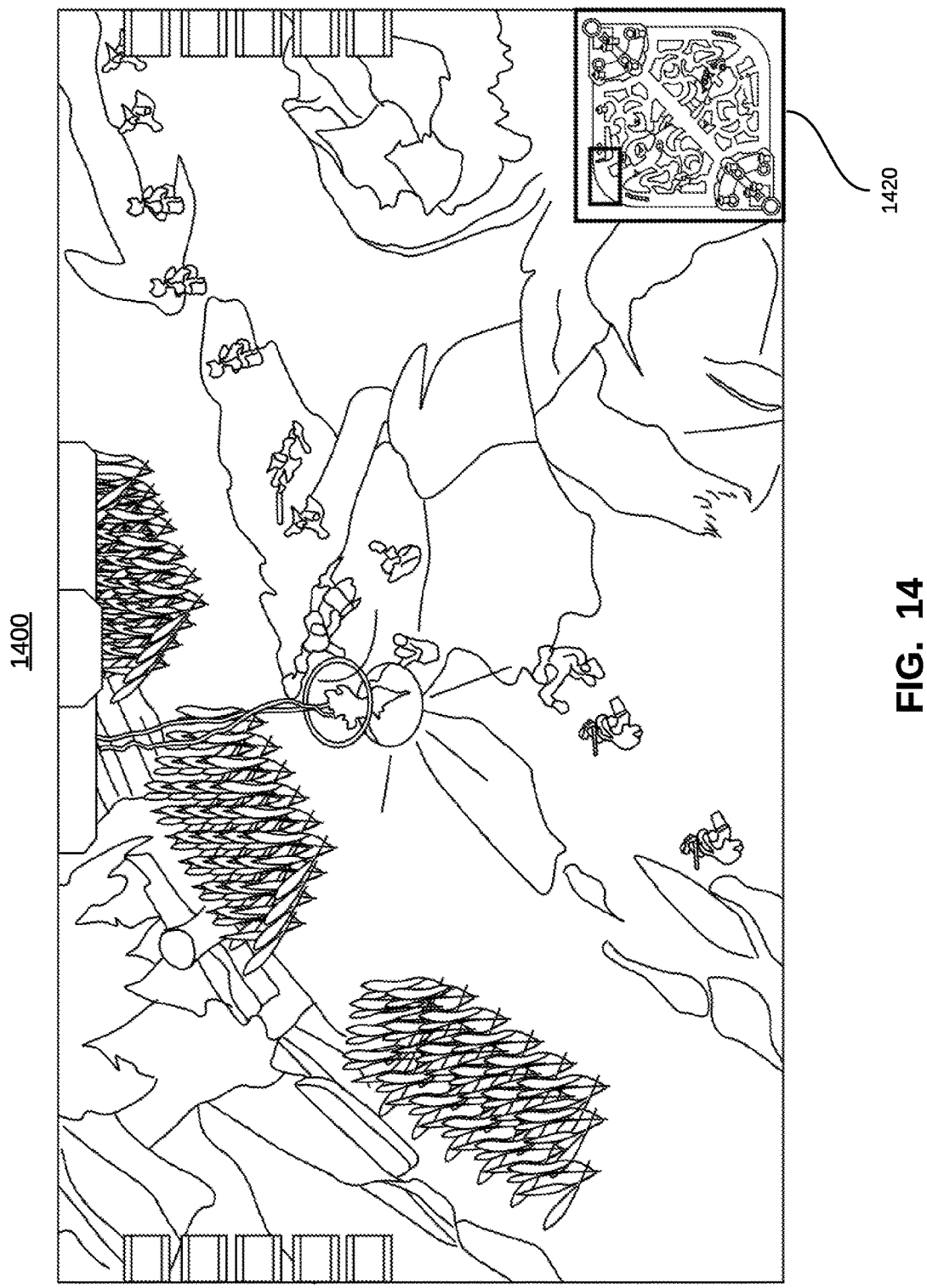
FIG. 14 is an exemplary screenshot of a 2D game broadcast of a game play of the multi-player online battle area game referenced in FIG. 13, according to one embodiment of the present invention.
Figure 15:
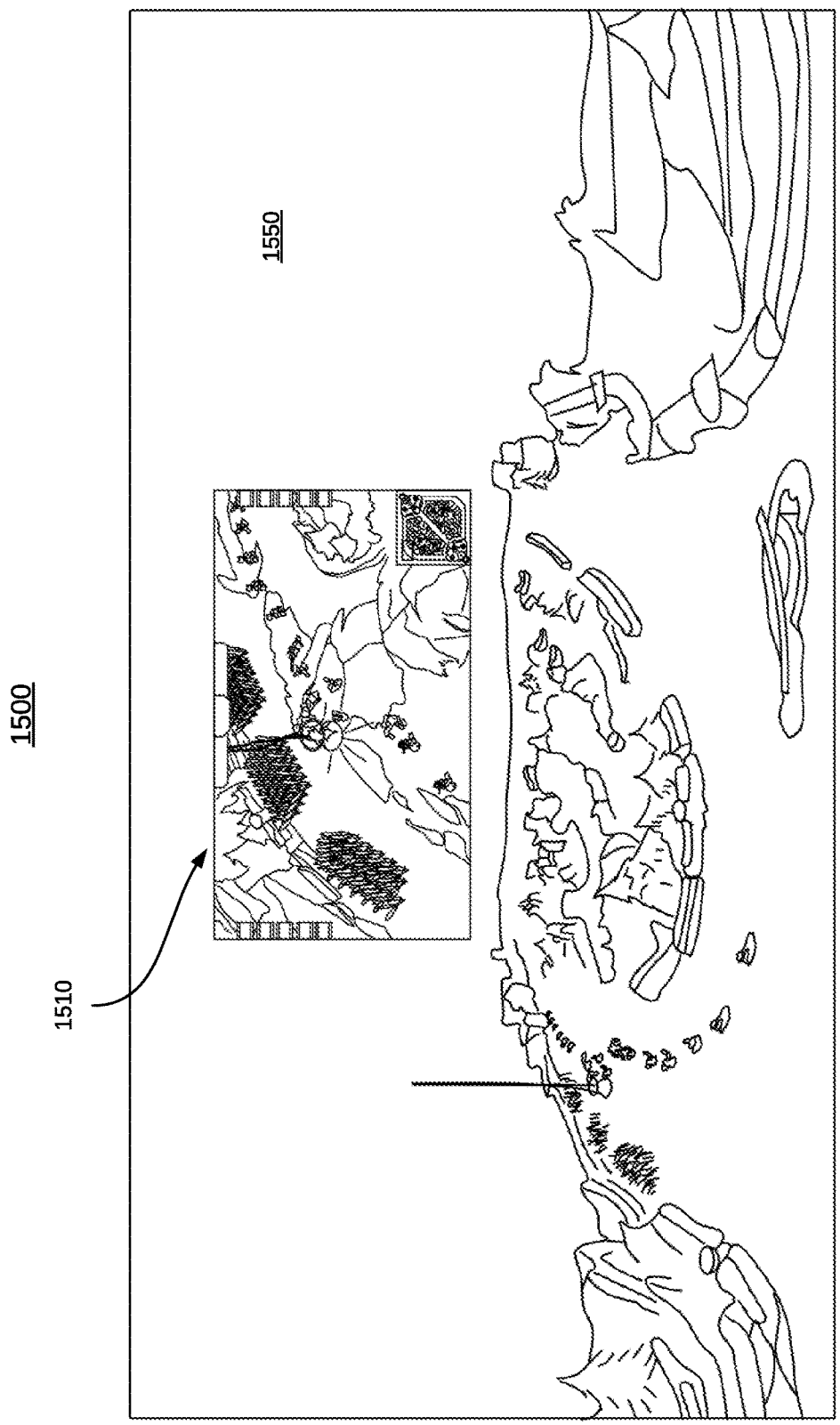
FIG. 15 is an exemplary screenshot of a spherical VR game broadcast of the game play in FIG. 14, according to one embodiment of the present invention.

FIG. 13 is an illustrative in-game map 1300 illustrating the Summoner's Rift arena in a multi-player online battle arena game League of Legends, again showing locations of virtual camera arrays for game environment capture, according to one embodiment of the present invention. In this particular example, eight virtual camera arrays 1310, 1320, 1330, 1340, 1350, 1360, 1370, and 1380 are provided by a SLIVER server, three along the top lane, two along the middle lane, and three along the bottom lane. Correspondingly, FIG. 14 is an exemplary screenshot of a 2D game broadcast of a game play of the multiplayer online battle area game referenced in FIG. 13, captured from a battle field located on the top left corner of the game map. Mini-map 1420 corresponds to map 1300, and may be used for graphical analysis of player, team, or battle field positions relative to virtual camera array locations for virtual camera array selection for game play capture. FIG. 15 is an exemplary screenshot of a corresponding spherical game video broadcast, as captured by virtual camera array 1310 shown in FIG. 13, facing from lower right to upper left towards the battle field, according to one embodiment of the present invention.

SLIVER Platform

Figure 16:
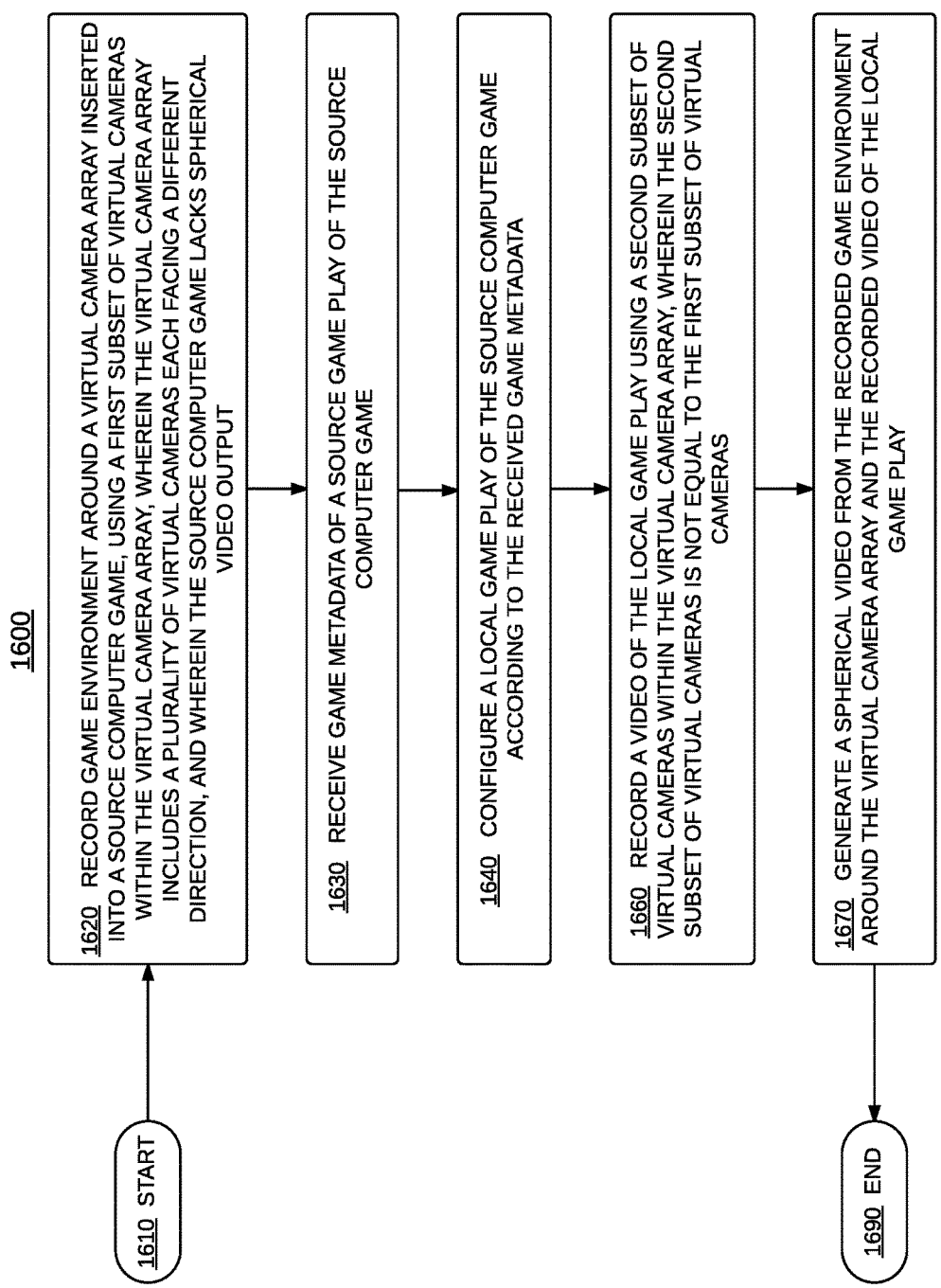
FIG. 16 is a flow diagram showing a method for generating a spherical video from computer games, according to one embodiment of the present invention.

In summary, to generate spherical videos from source computer games for virtual reality streaming and replay, FIG. 16 shows a flow diagram 1600 illustrating individual steps within this process, accordion to one embodiment of the present invention. In this particular embodiment, a single virtual camera array is used, for both game environment and game play capture. Specially, upon initiation at step 1610, game environment around a virtual camera array inserted into a source computer game may be recorded at step 1620, using a first subset of virtual cameras within the virtual camera array, wherein the virtual camera array includes a plurality of virtual cameras each facing a different direction, and wherein the source computer game may lack spherical video output. At step 1630, the SLIVER system receives game metadata of a source game play of the source computer game, and configures a local game play of the source computer game according to the received game metadata at step 1640. A video of the local game play is then recorded at step 1660 using a second subset of virtual cameras within the virtual camera array, wherein the second subset of virtual cameras is not equal to the first subset of virtual cameras. The process continues to generate a spherical video at step 1670 from the recorded game environment around the virtual camera array and the recorded video of the local game play, before terminating at step 1690.

Figure 17:
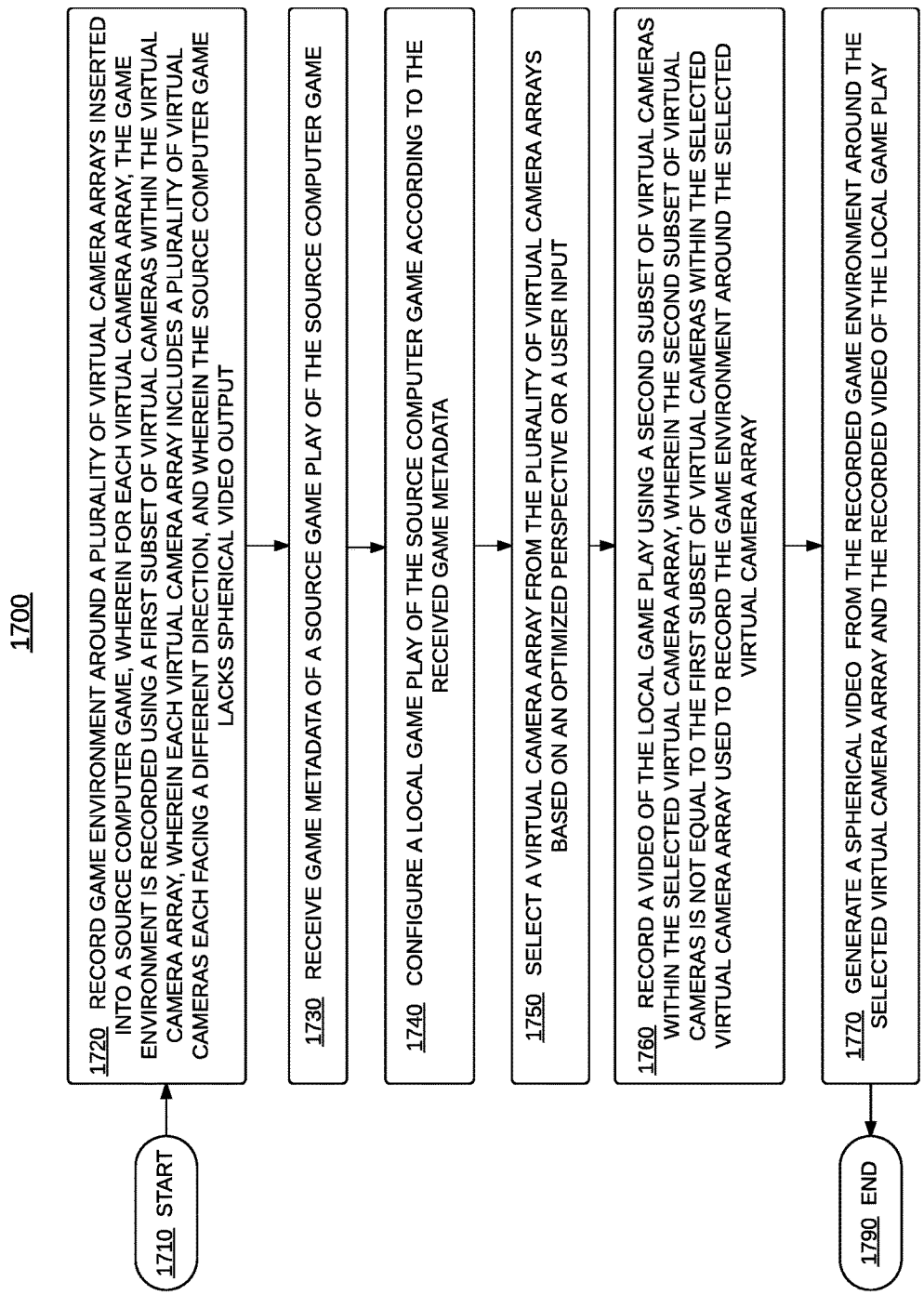
FIG. 17 is a flow diagram showing another method for generating a spherical video from computer games, according to another embodiment of the present invention.

FIG. 17 shows another flow diagram 1700 illustrating individual steps for generating spherical videos from computer games, according to another embodiment of the present invention. In this particular embodiment, multiple virtual camera arrays used, for game environment and game play capture, and the system may switch among the different virtual camera arrays as a game play progresses. Specifically, upon initiation at step 1710, game environment around a plurality of virtual camera arrays inserted into a source computer game may be recorded at step 1720, wherein for each virtual camera array, the game environment is recorded using a first subset of virtual cameras within the virtual camera array, wherein each virtual camera array includes a plurality of virtual cameras each facing a different direction, and wherein the source computer game may lack spherical video output. At step 1730, the SLIVER system receives game metadata of a source game play of the source computer game, and configures a local game play of the source computer game according to the received game metadata at step 1740. A virtual camera array is selected from the plurality of virtual camera arrays at step 1750 based on an optimized perspective or a user input. A video of the local game play is then recorded at step 1760 using a second subset of virtual cameras within the selected virtual camera array, wherein the second subset of virtual cameras is not equal to the first subset of virtual cameras within the selected virtual camera array used to record the game environment around the selected virtual camera array. The process continues to generate a spherical video at step 1770 from the recorded game environment around the selected virtual camera array and the recorded video of the local game play, before terminating at step 1790.

Figure 18:
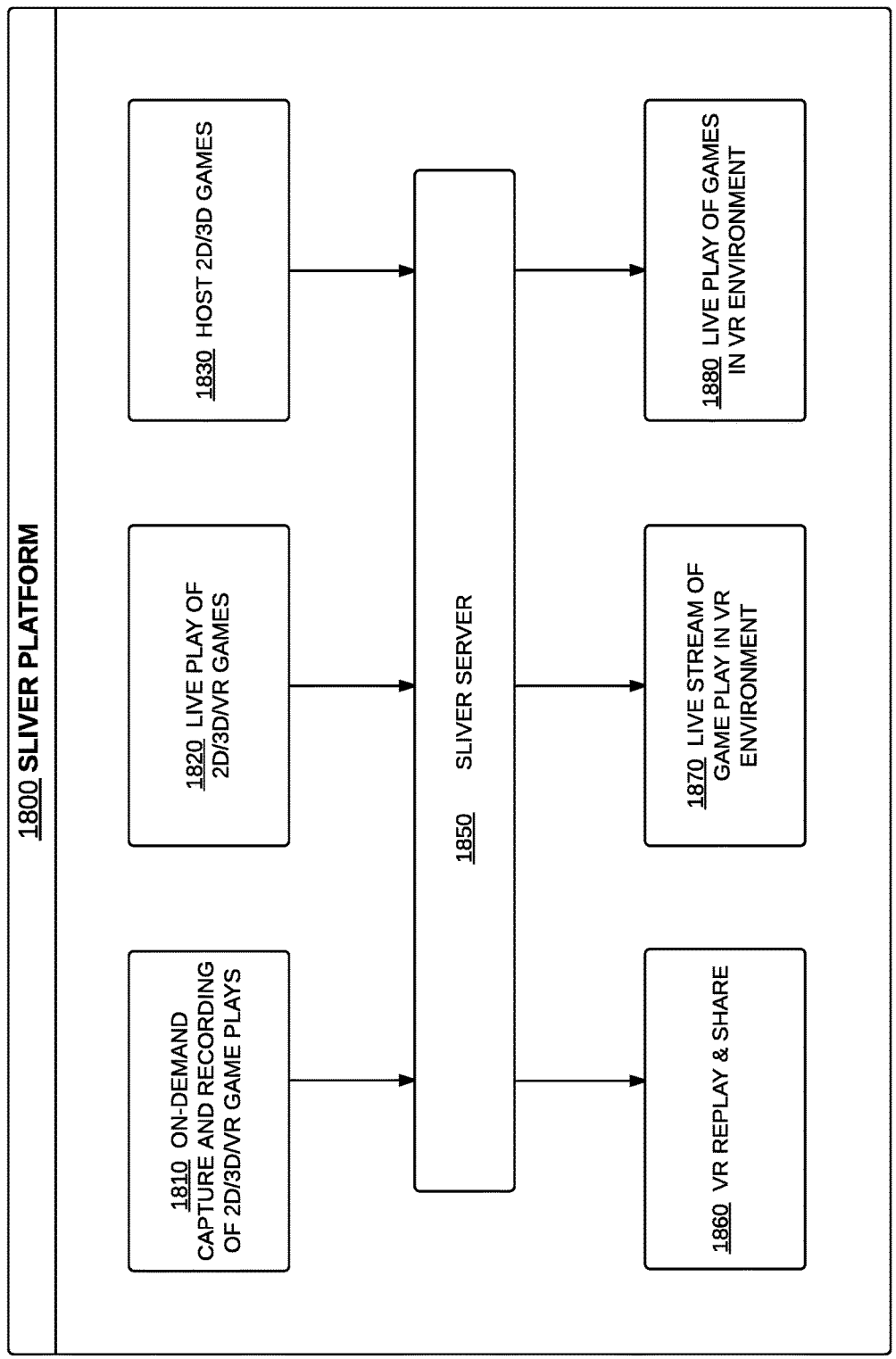
FIG. 18 is a schematic diagram illustrating a SLIVER platform, according to one embodiment of the present invention.

FIG. 18 is a schematic diagram illustrating functionalities provided by an extended SLIVER platform 1800, according to one embodiment of the present invention. Discussions within the present application have emphasized on the live streaming 1870 of a 2D, 3D, or VR games in an VR environment, where live game plays 1820 are processed in real-time by SLIVER server 1850. In some embodiments, SLIVER platform 1800 functions as game servers 1830 to host existing 2D, 3D, and even VR games to enable live game play 1880 in VR mode. Furthermore, SLIVER platform 1800 may provide on-demand capture and recording functions 1810 of 2D, 3D, and VR games, for post-processing within SLIVER server 1850, and VR replay and content sharing 1860 within SLIVER platform 1800.

Figure 19:
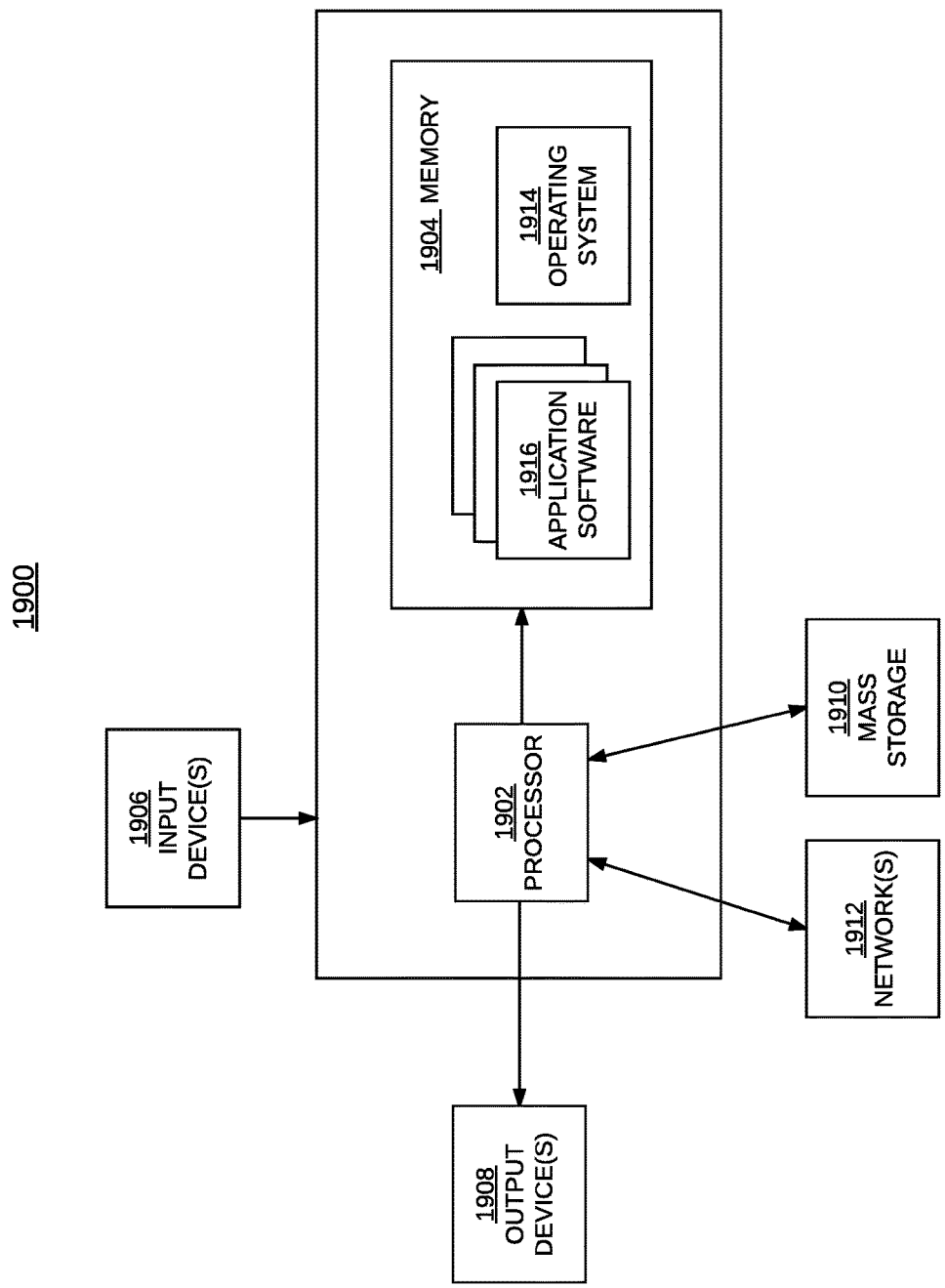
FIG. 19 is a schematic diagram of a computing device in which the present invention may be utilized, according to some embodiments of the present invention.

Finally, FIG. 19 is a schematic diagram of a computing device in which the present invention may be utilized, according to some embodiments of the present invention. A computing device comprises a hardware processor 1902 for executing program code, an operating system 1914, an application software 1916, which may implement the various embodiments of the present invention described herein, a physical memory 1904, at least one user device 1906, at least one output device 1908, a mass storage device 1910, and a network 1912. The network 1912 comprises a wired or wireless network to communicate to remote servers and databases via the Internet. The program code utilized by the computing device may be provided on a non-transitory physical storage medium, such as a local hard-disk, a hard-disk in the cloud, or any other physical storage medium (not shown).

CONCLUSIONS

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every end-user device is accommodated by the server to practice the methods of the present invention.

The present invention may be implemented in hardware and/or in software. Many components of the system, for example, network interfaces etc., have not been shown, so as not to obscure the present invention. However, one of ordinary skill in the art would appreciate that the system necessarily includes these components. A computing device is a hardware that includes at least one processor coupled to a memory. The processor may represent one or more processors (e.g., microprocessors), and the memory may represent random access memory (RAM) devices comprising a main storage of the hardware, as well as any supplemental levels of memory, e.g., cache memories, non-volatile or back-up memories (e.g., programmable or flash memories), read-only memories, etc. In addition, the memory may be considered to include memory storage physically located elsewhere in the hardware, e.g. any cache memory in the processor, as well as any storage capacity used as a virtual memory, e.g., as stored on a mass storage device.

The hardware of a computing device also typically receives a number of inputs and outputs for communicating information externally. For interface with a user, the hardware may include one or more user input devices (e.g., a keyboard, a mouse, a scanner, a microphone, a web camera, etc.) and a display (e.g., a Liquid Crystal Display (LCD) panel). For additional storage, the hardware my also include one or more mass storage devices, e.g., a floppy or other removable disk drive, a hard disk drive, a Direct Access Storage Device (DASD), an optical drive (e.g., a Compact Disk (CD) drive, a Digital Versatile Disk (DVD) drive, etc.) and/or a tape drive, among others. Furthermore, the hardware may include an interface to one or more networks (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces to communicate with each other.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

The hardware operates under the control of an operating system, and executes various computer software applications, components, program code, libraries, objects, modules, etc. to perform the methods, processes, and techniques described above.

In general, the method executed to implement the embodiments of the invention may be implemented as part of an operating system or a specific application, component, program, object, module or sequence of instructions referred to as "computer program(s)" or "program code(s)." The computer programs typically comprise one or more instructions set at various times in various memory and storage devices in a computing device or computer, and that, when read and executed by one or more processors in the computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMS), Digital Versatile Disks, (DVDs), etc.), and digital and analog communication media.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A system for generating spherical videos from computer games, comprising:
    a server having access to at least one processor; and
    a non-transitory physical medium for storing a source computer game and for storing program code, wherein the non-transitory physical medium is accessible by the server, and wherein the program code when executed by the processor causes the processor to:
        record a game environment around a virtual camera array inserted into the source computer game, using a first subset of virtual cameras within the virtual camera array, wherein the virtual camera array includes a plurality of virtual cameras each facing a different direction, and wherein the source computer game lacks spherical video output;
        receive a game metadata of a source game play of the source computer game;
        configure a local game play of the source computer game according to the received game metadata;
        record a video of the local game play using a second subset of virtual cameras within the virtual camera array, wherein the second subset of virtual cameras is not equal to the first subset of virtual cameras; and
        generate a spherical video from the recorded game environment and the recorded video of the local game play.

2. The system of claim 1, wherein the source computer game is selected from the group consisting of 2D games and 3D games.

3. The system of claim 1, wherein the source game play is a live game play.

4. The system of claim 1, wherein the virtual camera array is positioned at a fixed location within the source computer game.

5. The system of claim 1, wherein the spherical video generation is by aligning and stitching the game environment recorded by virtual cameras in the first subset but not in the second subset, to the video of the local game play recorded by the second subset of virtual cameras.

6. The system of claim 1, wherein at least one virtual camera within the second subset of virtual cameras records the local game play at a spatial or temporal frequency different from those of the virtual cameras within the first subset of virtual cameras.

7. A method for generating spherical videos from computer games, comprising:
    recording a game environment around a plurality of virtual camera arrays inserted into a source computer game, wherein for each virtual camera array, a game environment is recorded using a first subset of virtual cameras within the virtual camera array, wherein each virtual camera array includes a plurality of virtual cameras each facing a different direction, and wherein the source computer game lacks spherical video output;
    receiving a game metadata of a source game play of the source computer game;
    configuring a local game play of the source computer game according to the received game metadata;
    selecting a virtual camera array from the plurality of virtual camera arrays based on an optimized perspective or a user input;
    recording a video of the local game play using a second subset of virtual cameras within the selected virtual camera array, wherein the second subset of virtual cameras is not equal to the first subset of virtual cameras within the selected virtual camera array used to record the game environment around the selected virtual camera array; and
    generating a spherical video from the recorded game environment around the selected virtual camera array and the recorded video of the local game play.

8. The method of claim 7, wherein the optimized perspective is optimized over locations of the plurality of virtual camera arrays within a game map with respect to a set of positions within the game map, and contents of the game map.

9. The method of claim 7, wherein the optimized perspective is determined by analyzing a player field of view.

10. The method of claim 7, wherein the optimized perspective is optimized over a distance and a viewing angle towards a player position.

11. The method of claim 7, wherein the user input is from a broadcaster, a player, or a spectator.

12. The method of claim 7, wherein the selection of the virtual camera array is limited to a proper subset of the plurality of virtual camera arrays.

13. The method of claim 7, wherein the source computer game is selected from the group consisting of 2D games and 3D games.

14. The method of claim 7, wherein the source game play is a live game play.

15. The method of claim 7, wherein each of the plurality of virtual camera arrays is positioned at a fixed location within the source computer game.

16. The method of claim 7, wherein the spherical video generation is by aligning and stitching the game environment recorded by virtual cameras in the first subset but not in the second subset of virtual cameras within the selected virtual camera array, to the video of the local game play recorded by the second subset of virtual cameras within the selected virtual camera array.

17. A non-transitory computer-readable storage medium for generating spherical videos from computer games, the storage medium comprising a source computer game and program code stored thereon, that when executed by a processor causes the processor to:
record a game environment around a plurality of virtual camera arrays inserted into the source computer game, wherein for each virtual camera array, the game environment is recorded using a first subset of virtual cameras within the virtual camera array, wherein each virtual camera array includes a plurality of virtual cameras each facing a different direction, and wherein the source computer game lacks spherical video output;
receive a game metadata of a source game play of the source computer game;
configure a local game play of the source computer game according to the received game metadata;
select a virtual camera array from the plurality of virtual camera arrays based on an optimized perspective or a user input;
record a video of the local game play using a second subset of virtual cameras within the selected virtual camera array, wherein the second subset of virtual cameras is not equal to the first subset of virtual cameras within the selected virtual camera array used to record the game environment around the selected virtual camera array; and
generate a spherical video from the recorded game environment around the selected virtual camera array and the recorded video of the local game play.

18. The non-transitory computer-readable storage medium of claim 17, wherein the optimized perspective is optimized over locations of the plurality of virtual camera arrays within a game map with respect to a set of positions within the game map, and contents of the game map.

19. The non-transitory computer-readable storage medium of claim 17, wherein the optimized perspective is determined by analyzing a player field of view.

20. The non-transitory computer-readable storage medium of claim 17, wherein the optimized perspective is optimized over a distance and a viewing angle towards a player position.

21. The system of claim 1, wherein the spherical video has a 360-degree horizontal viewing angle.

22. The system of claim 1, wherein the virtual camera array was inserted into the source computer game using a capture client provided by a Software Development Kit (SDK) or a game connector module.

23. The system of claim 1, wherein the program code when executed by the processor further causes the processor to: superimpose the spherical video with a 2D broadcast of the source game play, wherein the spherical video and the 2D broadcast of the source game play are synchronized in time.

24. The non-transitory computer-readable storage medium of claim 17, wherein the spherical video has a 360-degree horizontal viewing angle.

25. The non-transitory computer-readable storage medium of claim 17, wherein the plurality of virtual camera arrays was inserted into the source computer game using a capture client provided by a Software Development Kit (SDK) or a game connector module.

26. The non-transitory computer-readable storage medium of claim 17, wherein the program code when executed by the processor further causes the processor to: superimpose the spherical video with a 2D broadcast of the source game play, wherein the spherical video and the 2D broadcast of the source game play are synchronized in time.

* * * * *

UNITED STATES PATENT AND TRADEMARK OFFICE
CERTIFICATE OF CORRECTION

PATENT NO. : 9,573,062 B1
APPLICATION NO. : 15/292350
DATED : February 21, 2017
INVENTOR(S) : Jieyi Long et al.

Page 1 of 1

It is certified that error appears in the above-identified patent and that said Letters Patent is hereby corrected as shown below:

On the Title Page

Item [73] (Assignee):
Correct the spelling of the Assignee from "Silver VR Technologies, Inc., Cupertino, CA (US)" to "Sliver VR Technologies, Inc., Cupertino, CA (US)"

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*